United States Patent [19]

Kinoshita

[11] Patent Number: 4,724,423
[45] Date of Patent: Feb. 9, 1988

[54] CHARACTER INPUT SYSTEM

[76] Inventor: Akiyoshi Kinoshita, 16-11, Takaban 2-chome, Meguro-ku, Tokyo, Japan

[21] Appl. No.: 692,932

[22] Filed: Jan. 18, 1985

[51] Int. Cl.⁴ .............................................. G06F 3/02
[52] U.S. Cl. .............................. 340/365 S; 340/365 R; 382/13
[58] Field of Search ............ 340/365 S, 365 R, 365 C, 340/712; 382/13, 11, 30; 178/18, 17 C; 179/90 K

[56] References Cited

U.S. PATENT DOCUMENTS

| | | | |
|---|---|---|---|
| 3,996,557 | 12/1976 | Donahey | 382/13 |
| 4,005,400 | 1/1977 | Engdahl | 382/13 |
| 4,047,010 | 9/1977 | Perotto et al. | 382/13 |
| 4,139,837 | 2/1979 | Liljenwall et al. | 382/13 |
| 4,159,471 | 6/1979 | Whitaker | 340/956 |
| 4,199,751 | 4/1980 | Piguet | 382/13 |
| 4,477,797 | 10/1984 | Nakagiri | 340/365 S |
| 4,490,056 | 12/1984 | Whitaker | 340/365 S |
| 4,523,298 | 6/1985 | Sakurai | 340/365 S |

*Primary Examiner*—John W. Caldwell, Sr.
*Assistant Examiner*—Mahmoud Fatahi-yar
*Attorney, Agent, or Firm*—Fliesler, Dubb, Meyer & Lovejoy

[57] ABSTRACT

A parallel operation in which two input devices of nine input devices disposed in a square arrangement of, for instance, 3×3, are touched substantially simultaneously is performed at least once, so that a character code corresponding to the input signal is produced, and thereby character input is performed. Furthermore, in the present invention, by using an independent operation of a single input device together with a parallel operation of two input devices, and operating the input devices in a predetermined sequence, such as from top to bottom or in the sequence of the pen-stroke describing the character, a character code corresponding to the signal inputted by the operations is produced, so that character input is performed.

11 Claims, 20 Drawing Figures

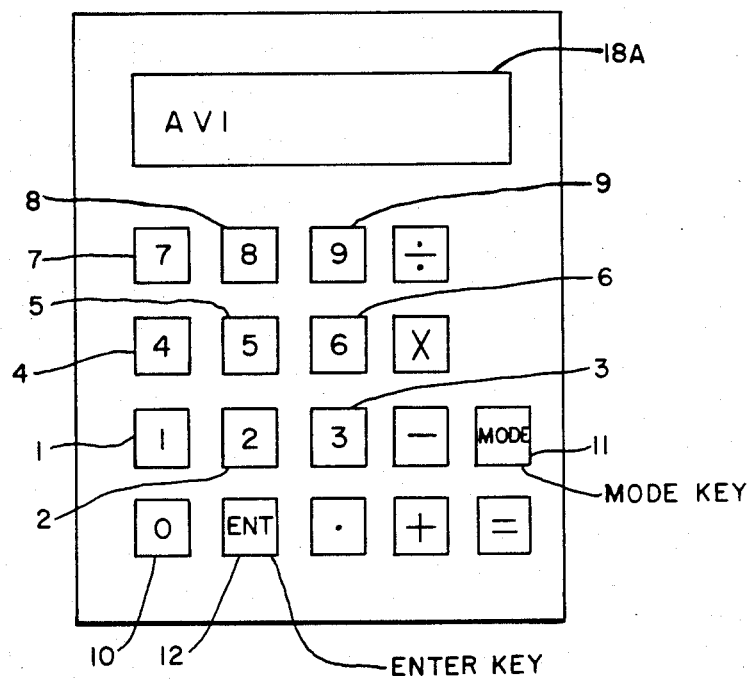
FIG.—1A
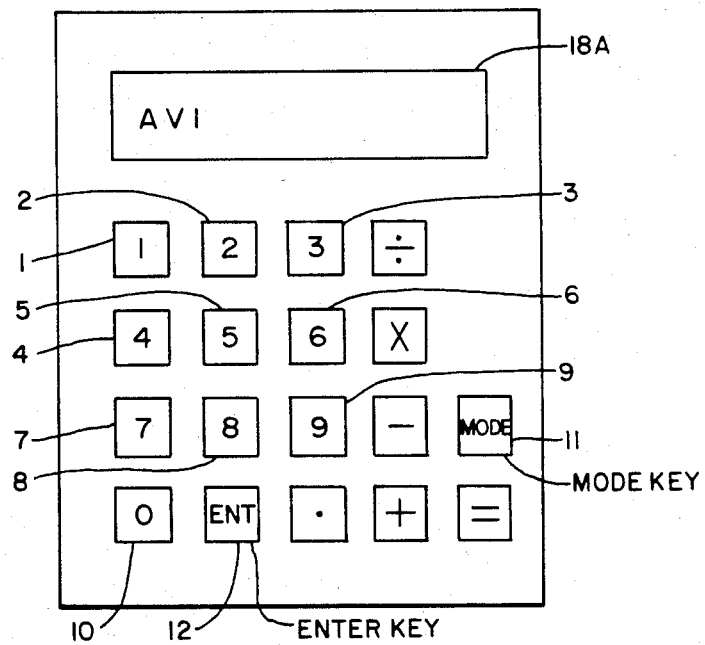
FIG.—1B

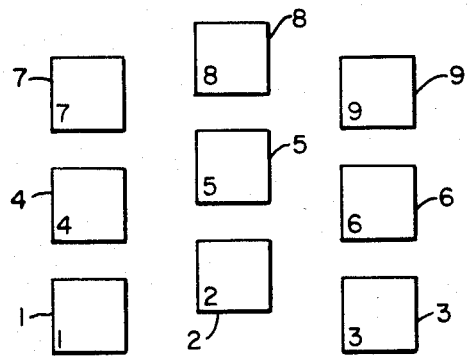
FIG.-IC
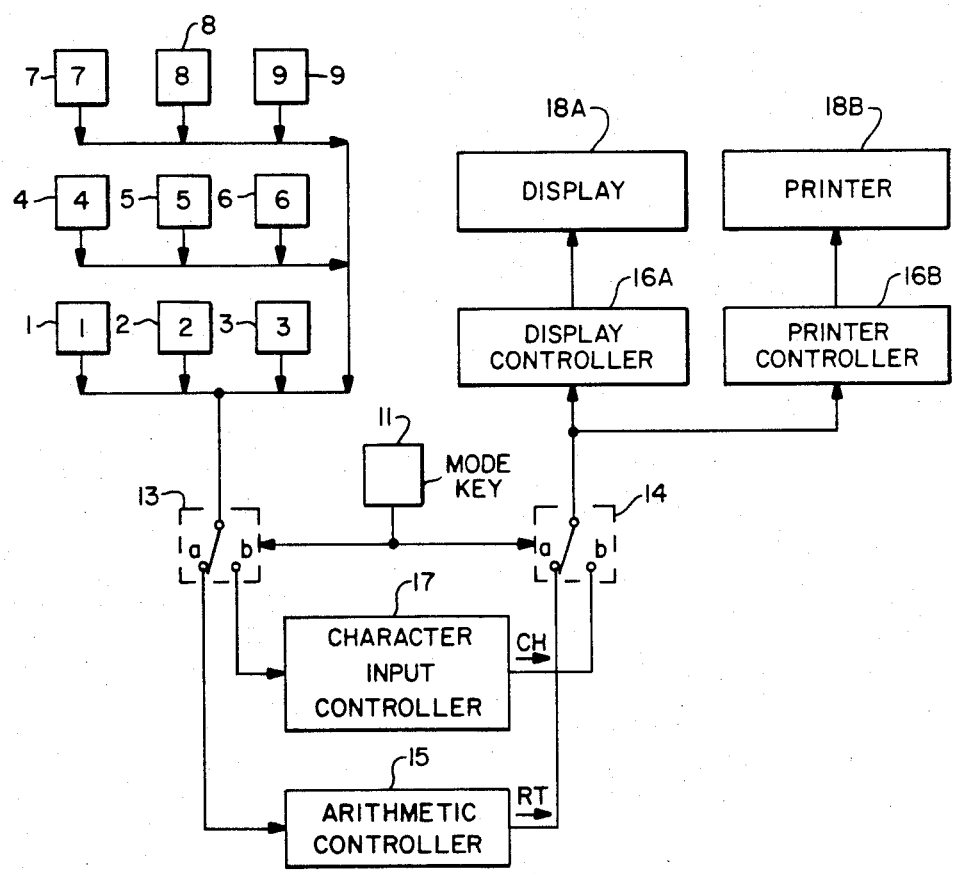
FIG.—2

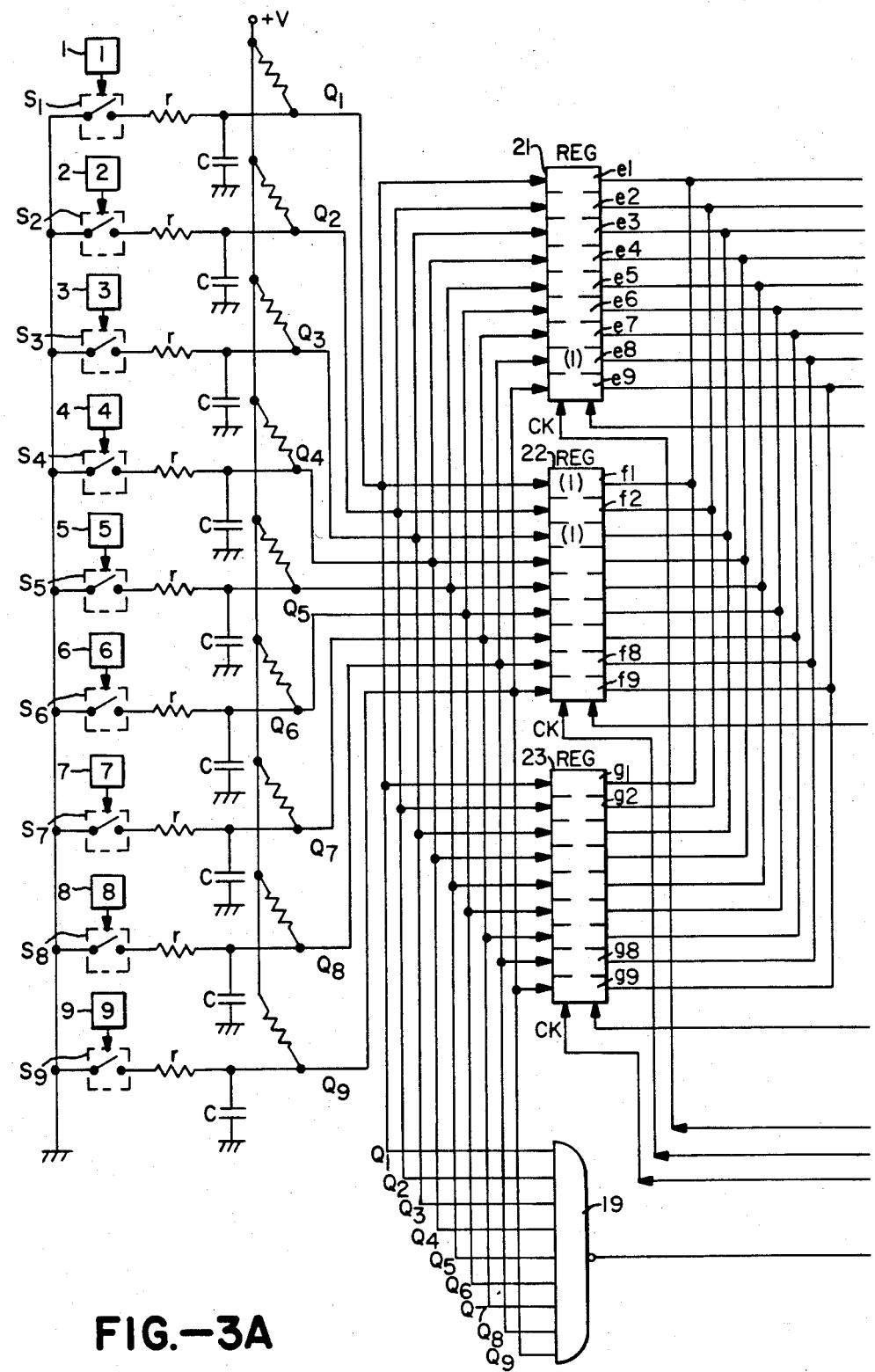
FIG.—3A

FIG.—7

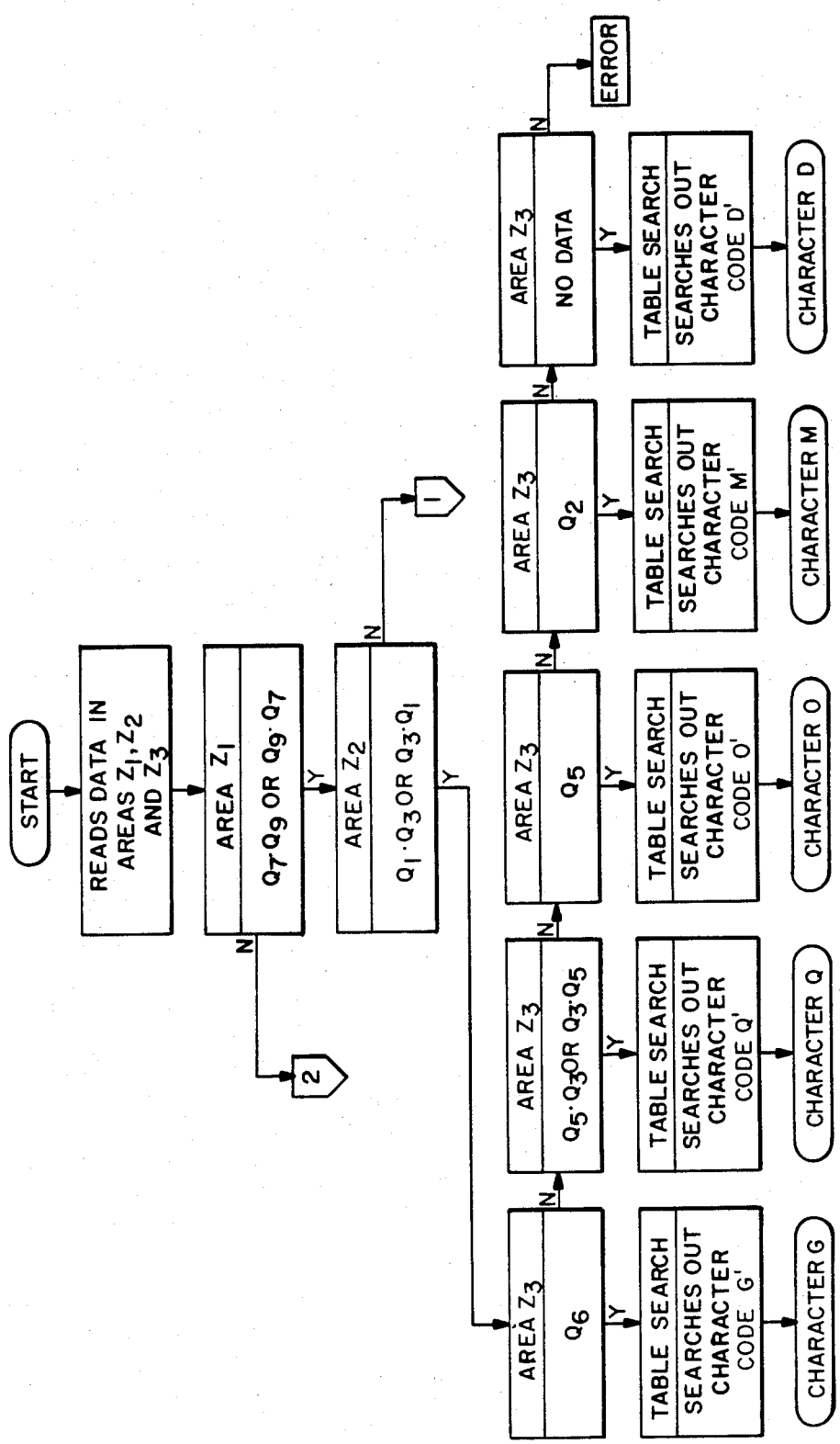
FIG.—9A

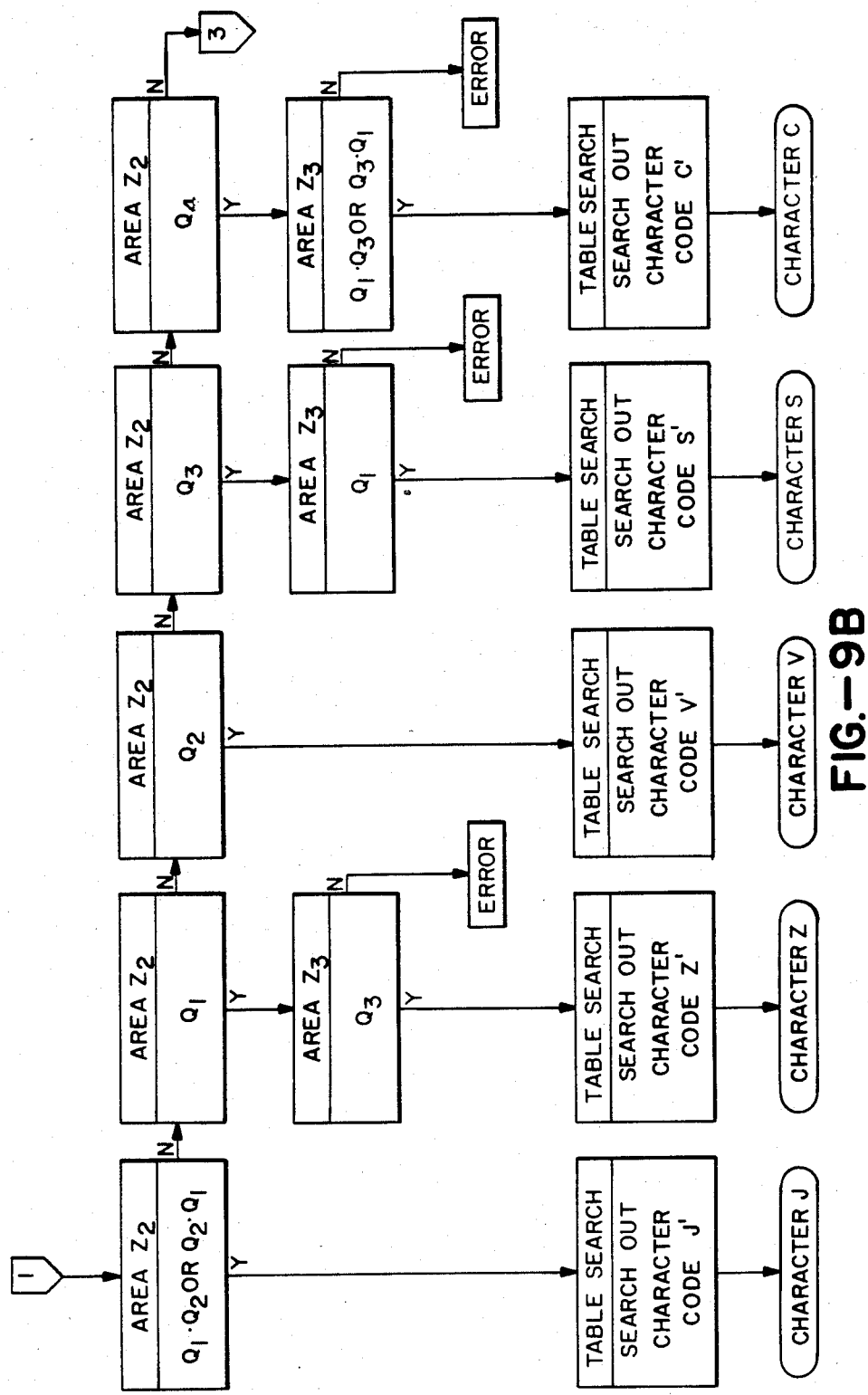
FIG.—9B

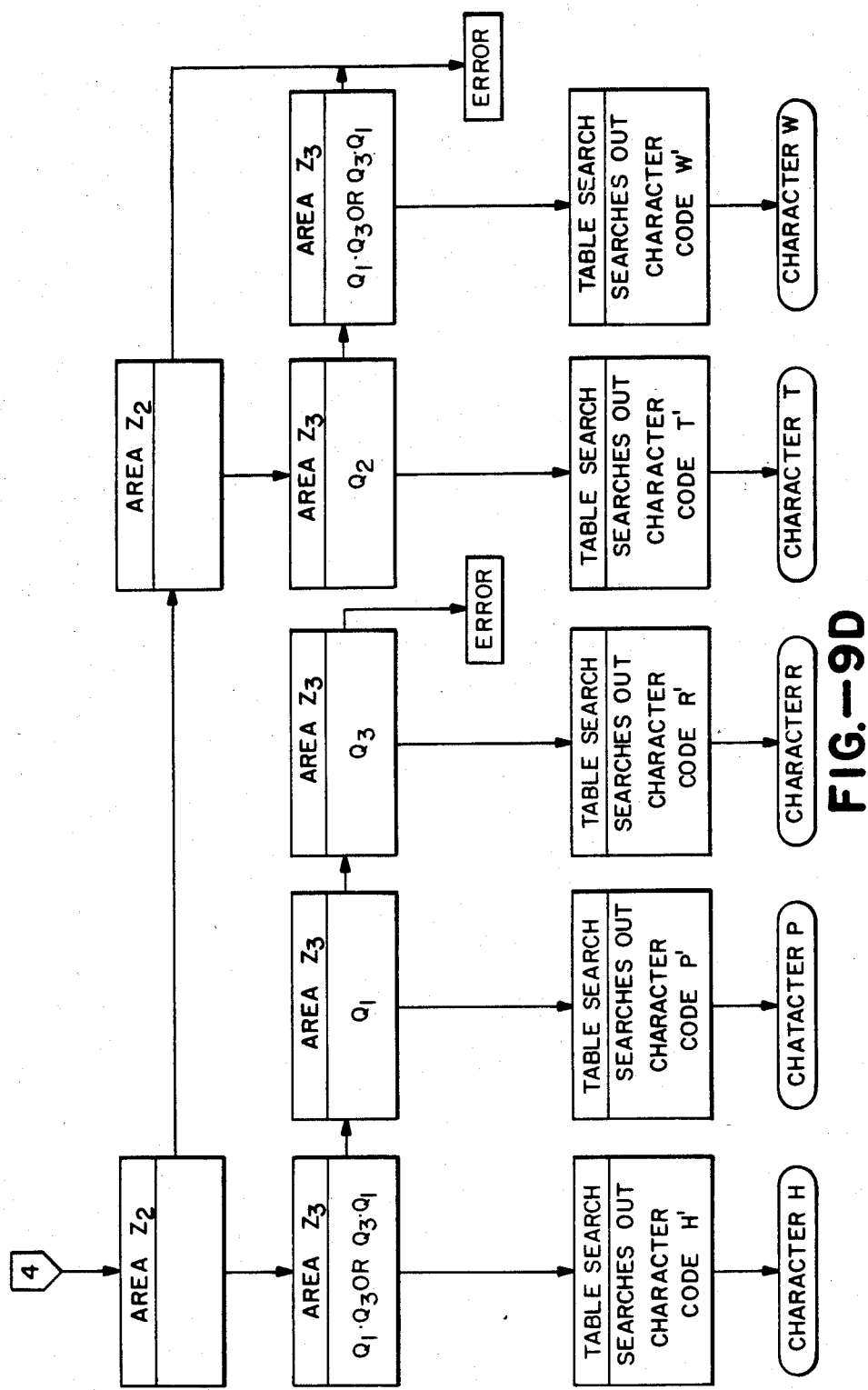
FIG.—9D

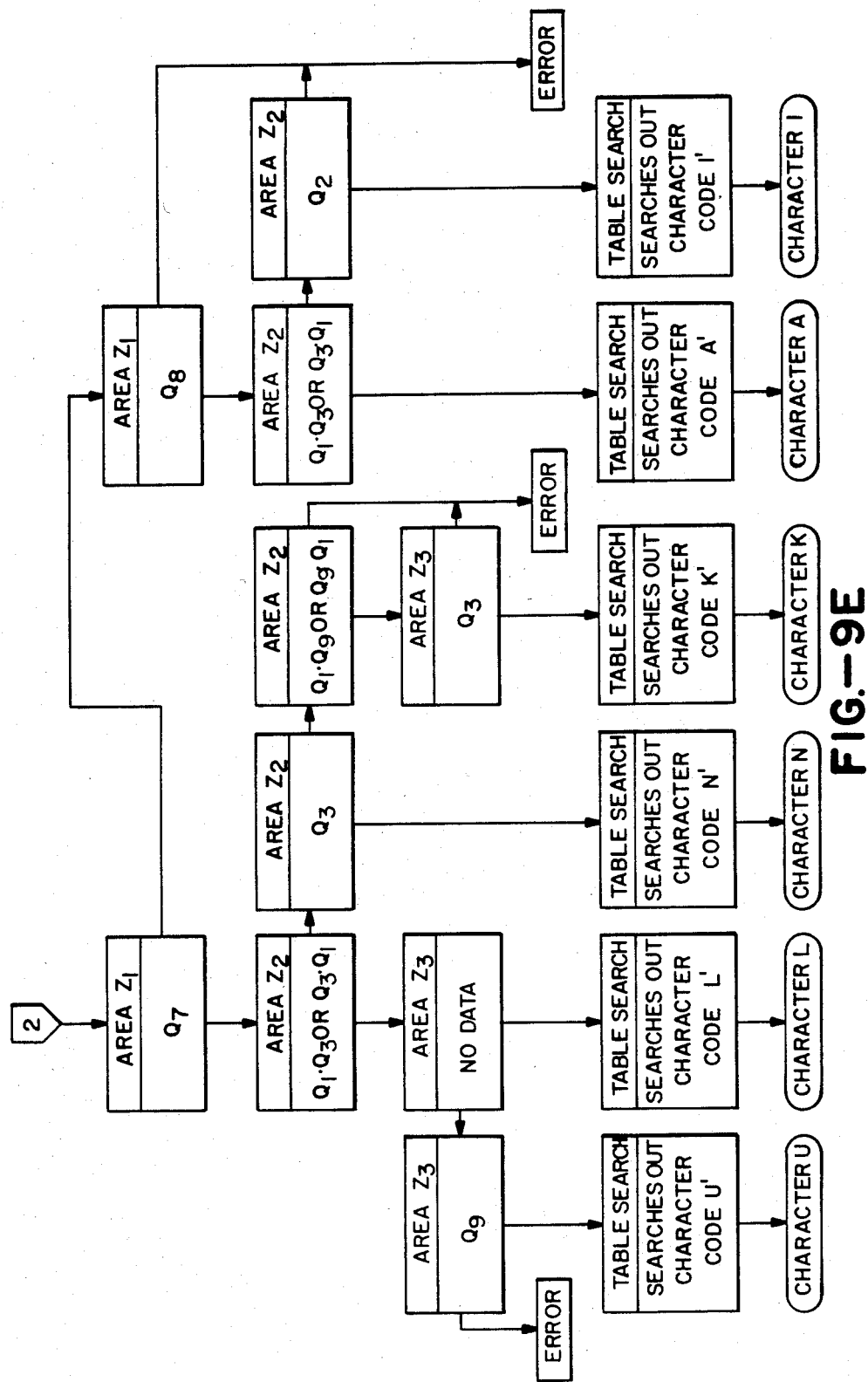

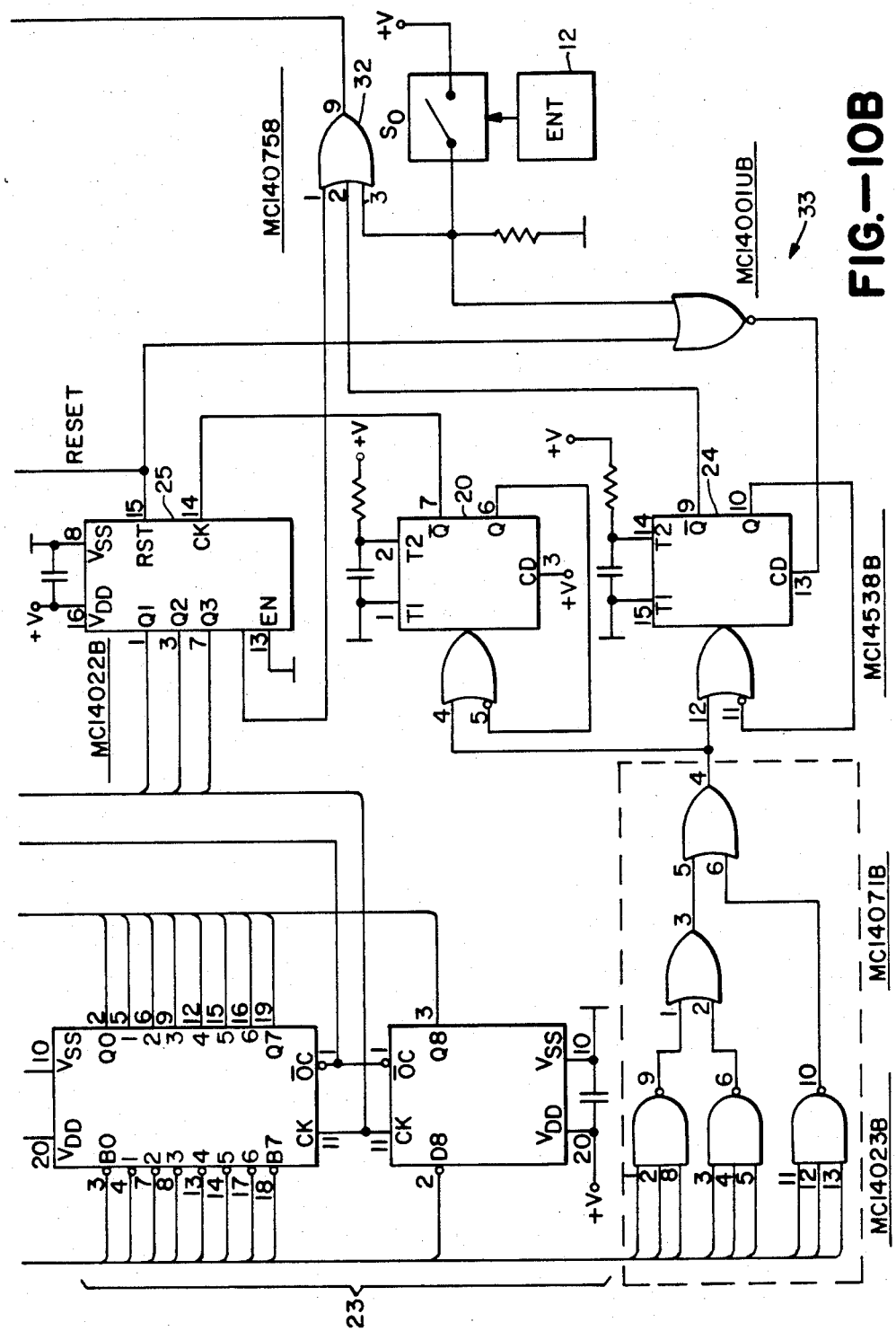
FIG.—10B

CHARACTER INPUT SYSTEM

BACKGROUND OF THE INVENTION

1. Field of the Invention

The present invention relates to a character input system having a plurality of input elements disposed in a two dimensional manner.

2. Description of the Prior Art

When a memorandum-recording function is added to very small electronic apparatus such as business card-sized calculators or wrist watches, it is difficult to dispose a sufficient number of touch-activated character input devices such as character keys necessary for a variety of characters (26 in the case of the alphabet) because of the limited area of the operation panel on such electronic units.

As one of solutions for overcoming this difficulty, it may be thought to use nine input devices in total disposed in a square configuration of, for instance, 3×3. This arrangement provides two kinds of input methods. The first method involves inputting a character by describing its shape on an operation panel which is composed of input devices such as key switches. This method is disclosed in U.S. Pat. No. 3,909,785. The second method involves inputting a character by operating, in a predetermined sequence, only those input devices in positions corresponding to the characteristic and unique points which shape the character such as the character's starting point, its corners (turning points) and finishing point. Although this second input method offers a faster input speed than the first input method, it involves numerous input operations and still has the drawback of a slow input speed.

Further, in Swiss Patent No. 533,332 and Japanese Patent Application Laid-Open No. 54-4527, there is disclosed a plurality of key switches arranged in 3×5 and 3×3, respectively, so that the key switches represent various segments of characters or numerals. In these disclosure, the key switches do not produce character codes, but produce signals corresponding to segments of actual characters. In these cases, it is necessary that many segments of a character are inputted. As a result, these methods still involve many input operations and accordingly such an inputting operation requires a substantially long time.

SUMMARY OF THE INVENTION

It is, therefore, an object of the present invention to overcome the above-mentioned drawback by providing a character input system which performs character input by using a small number of input devices.

It is a further object of the present invention to provide a character input system for inputting alphabetic or similar phonetic symbols using input devices in a ten-key configuration.

In order to achieve these objects, in the present invention, a parallel operation in which two input devices of nine input devices disposed in a square arrangement of, for instance, 3×3, are touched substantially simultaneously is performed at least once, so that a character code corresponding to the input signal is produced, and thereby character input is performed.

Furthermore, in the present invention, by using an independent operation of a single input device together with a parallel operation of two input devices, and operating the input devices in a predetermined sequence, such as from top to bottom or in the sequence of the pen-stroke describing the character, a character code corresponding to the signal inputted by the operations is produced, so that character input is performed.

In one aspect of the present invention, a character input system comprises: input means for inputting a plurality of input signals by touch-activating a plurality of input sections; means for accepting at least two of the input signals produced by touch-activating at least two of the input sections substantially simultaneously; and means for generating a character code corresponding to the accepted input signals.

In a second aspect of the present invention, a character input system comprises: input means for inputting a plurality of input signals by touch-activating a plurality of input sections; means for accepting at least two of the input signals produced by touch-activating at least two of the input sections substantially simultaneously; means for generating a character code corresponding to the accepted input signals; means for storing temporarily a signal inputted by repeating a plurality of input operations in which at least two of the touch-activated input devices are operated substantially simultaneously; and means for generating a character code corresponding to the temporarily stored input signal.

In a third aspect of the present invention, a character input system comprises: input means for inputting a plurality of input signals by touch-activating a plurality of input sections; means for accepting at least two of the input signals produced by touch-activating at least two of the input sections substantially simultaneously; means for generating a character code corresponding to the accepted input signals; means for storing temporarily a signal inputted by a first input operation in which at least two of the touch-activated input sections are operated substantially simultaneously and by a second input operation in which a single touch-activated input sections is operated solely; and means for generating a character code corresponding to the temporarily stored input signal.

Here, the input means may have nine touch-activated input devices disposed on a plane in the form of a matrix of 3×3. The nine touch-activated input devices can input numerals 1-9.

The touch-activated input devices which input numerals 1-9 may be disposed in 3×3 matrixes (i) and (ii) having the following configurations:

| 7 | 8 | 9 | or | 1 | 2 | 3 |
| 4 | 5 | 6 |    | 4 | 5 | 6 |
| 1 | 2 | 3 |    | 7 | 8 | 9 | and the generating means may generate alphabetic characters A–Z by performing input from touch-activated input sections arranged as in matrix (i) in the manner of the following table:

| Character | Step I | Step II | Step III |
| --- | --- | --- | --- |
| A | 8 | 1·3 |  |
| B | 7·9 | 6 | 1·3 |
| C | 7·9 | 4 | 1·3 |
| D | 7·9 | 1·3 |  |
| E | 7·9 | 4·5 | 1·3 |
| F | 7·9 | 4·5 | 1 |
| G | 7·9 | 1·3 | 6 |
| H | 7·9 | 4·6 | 1·3 |
| I | 8 | 2 |  |

-continued

| Character | Step I | Step II | Step III |
|---|---|---|---|
| | or 8 · 2 | | |
| J | 7 · 9 | 1 · 2 | |
| K | 7 | 1 · 9 | 3 |
| | or 9 | | |
| L | 7 | 1 · 3 | |
| M | 7 · 9 | 1 · 3 | 2 |
| | | or 1 · 2 · 3 | |
| N | 1 | 7 · 3 | 9 |
| | or 7 | 3 | |
| O | 7 · 9 | 1 · 3 | 5 |
| P | 7 · 9 | 4 · 6 | 1 |
| Q | 7 · 9 | 1 · 3 | 5 · 3 |
| | or 5 | 3 | |
| R | 7 · 9 | 4 · 6 | 3 |
| S | 7 · 9 | 3 | 1 |
| T | 7 · 9 | 8 | 2 |
| U | 7 | 1 · 3 | 9 |
| V | 7 · 9 | 2 | |
| W | 7 · 9 | 8 | 1 · 3 |
| | or 7 · 8 · 9 | 1 · 3 | |
| X | 7 · 9 | 5 | 1 · 3 |
| | or 7 · 3 | 1 · 9 | |
| Y | 7 · 9 | 5 | 2 |
| Z | 7 · 9 | 1 | 3 |

The character input system may further comprise an entry input device for instructing to generate a character code in accordance with the accepted input signal in response to the entry input by the entry input device.

The character input system may further comprise means for storing a table for comparing the input signal and character code. The character input system may further comprise means for storing contents of the above-described table.

The accepting means may have means for storing the at least two input signals temporarily.

BRIEF DESCRIPTION OF THE DRAWINGS

FIGS. 1A, 1B and 1C are front views showing three embodiments of an character input system according to the present invention;

FIG. 2 is a block drawing showing an outline of a switching control circuit according to the present invention;

FIGS. 3A-3C are block diagrams showing an embodiment of the switching control circuit in a character input system according to the present invention;

FIGS. 9A-9E are flowcharts illustrating a detailed embodiment of a processing sequence of a retrieval routine in the character conversion program; and FIG. 10A-10C are circuit diagrams showing a detailed embodiment of a character input system of the present invention.

DETAILED DESCRIPTION OF THE PREFERRED EMBODIMENTS

Figure 3B:
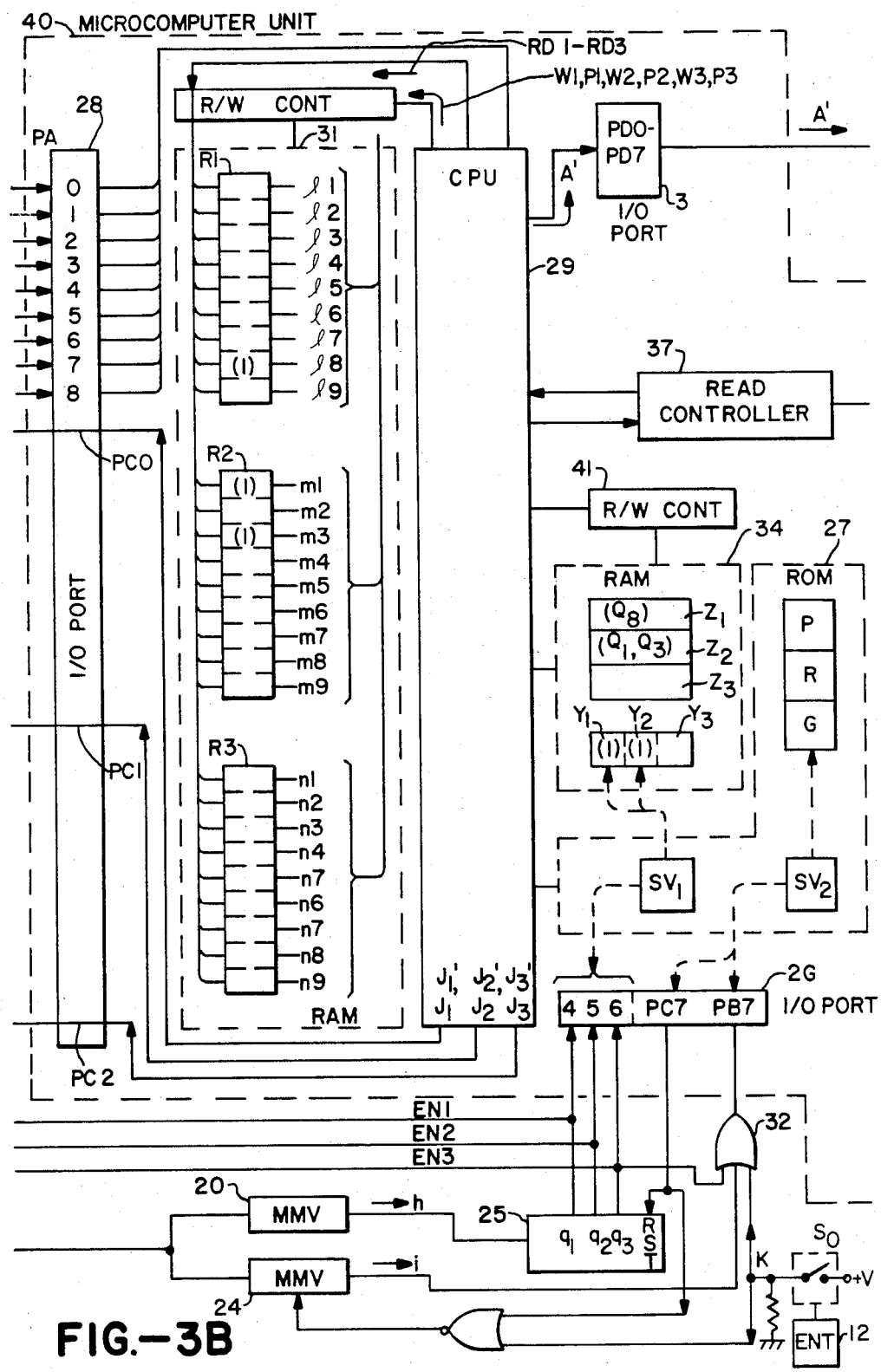

FIGS. 1A and 1B show two embodiments of a character input system according to the present invention. An embodiment of an electrical circuit of the character input system is shown in FIG. 2.

In FIG. 1A, the character input system according to the present invention has a touch-activated input device such as a ten-key pad for inputting the numerals [1] - [9] in the same manner as in a conventional calculator, that is the numeric keys 1 to 9 and 10 as well as calculation keys (addition, subtraction, multiplication and division). Additionally, the system has a MODE key 11 and an ENTER key 12. The touch-activated input device is not limited to a ten-key pad. A touch-sensitive panel can also be used as such input device.

Although the ten numeric keys 1 to 10 are for numeric input, the nine numeric keys 1 to 9 can be switched for character input by pressing the MODE key 11. That is, of the 10 keys on the ten-key pad, the nine numeric keys 1 to 9 for inputting the numbers [1] to [9] can be used for character input. Furthermore, when no special ENTER key 12 is included, the numeric key 10 can be used as a function key for entry when the system is in the character input mode specified by the MODE key 11.

Alternatively, the ten-key pad can be disposed as shown in FIG. 1B. Instead of disposing the ten-key pad in the square configuration shown in FIG. 1A or 1B, any of the rows of keys may be shifted as shown in FIG. 1C, in which the second or the center row is shifted upwardly so that the fingers of an operator can be positioned pertinently at respective rows.

The above-mentioned switching control circuit will be explained with reference to FIG. 2. In FIG. 2, the switching of switching sections 13 and 14 is controlled by a MODE key 11. The switching sections 13 and 14 are normally positioned on the side of contact a. Accordingly, a numeric code NC is normally applied through the contact a to an arithmetic controller 15 by pressing the numeric keys 1-9, and output data RT showing the results of those calculations are applied through the contact a in the switching section 14 to a display controller 16A and are displayed on a display 18A such as a liquid crystal display or a CRT. Furthermore, output data RT can be outputted to a variety of output units other than the display 18A alone, such as to a printer 18B through a printer controller 16B for printing. Additionally, these output data RT can be recorded in various recording mediums such as laser cards, IC cards, RAM, floppy discs, laser discs or magnetic tape.

On the other hand, when inputting characters such as alphabet, the MODE key 11 is pressed, so that the switching sections 13 and 14 are switched to their respective b contacts.

When the numeric keys 1-9 are pressed in the input configuration described below, the input character code NC is inputted through the contact b of the switching section 13 to a character input controller 17.

In the character input controller 17, the series of inputted numeric codes NC are converted into corresponding character codes CH, and the character codes CH are transferred through the contact b of the switching section 14 to the display controller 16, and the character is displayed on the display 18A.

The operation method for inputting the 26 alphabetic characters using the above-mentioned nine numeric keys 1 to 9 is as follows. For the 3×3 matrix shown in FIG. 1A, when inputting character (A) for example, the first step is to press the numeric key 8 (that is 8) with a single finger (for example, the middle finger). The next step is to press the numeric keys 1 (that is 1) and 3 (that is 3) with two fingers (for example, the index finger and the ring finger) substantially simultaneously. Next, when the ENT (ENTER) key 12 is pressed, the character (A) is displayed on the display section 18A (FIG. 2). Moreover, when inputting the character (V), the numeric keys 7 (that is 7) and 9 (that is 9) are pressed with two fingers (for example, the index finger and the ring finger). Then, pressing the numeric key 2 (2) with the middle finger for example, and thereafter when the ENTER key 12 is pressed, the character (V) is inputted and displayed.

In the example of inputting the character (A) just described, it is noticed that the character forms a triangular shape, and by pressing the three numeric keys 8, 1 and 3 that correspond to the apexes of that triangle in only two steps, the character (A) is inputted. In the case of the character (V), on the other hand, it is noticed that the character forms the shape of an inverted triangle, and by pressing the three numeric keys 7, 9 and 2 that correspond to the apexes of that inverted triangle in two steps, the character (V) is inputted.

As just described, using the nine input devices (numeric keys in the present embodiment) disposed in a square configuration, a single character is inputted by pressing the required input devices in order. The input of the character (I) shall be explained as a further example of inputting.

In this case, the first step is to press the numeric key 8 (that is 8) with, for example, the middle finger. Then in the second step, after pressing the numeric key 2 (that is 2), the ENTER key 12 is pressed, and then the character (I) is inputted and displayed on the display 18A. This procedure interprets the character (I) to be formed in a bar shape (formed by the row of numeric keys 8, 5 and 2), and of these three numeric keys by pressing only the numeric key 8 and the numeric key 2 which correspond to the top and bottom, respectively, of the predetermined pen-stroke sequence forming the character, the character (I) is inputted. In this case, it is omitted to press the numeric key 5 (5).

As described above, in the present invention use is made of a plurality (for example, nine) of input devices and permits character input on the basis of the following principles.

(1) To operate those input devices in the respective positions of the unique points showing the characteristic form of the character (such as the start, finish, and turns of the predetermined pen-stroke sequence describing the character).

(2) To operate a plurality of input devices forming the "shape" of a character according to a predetermined pen-stroke sequence.

(3) Of the above-mentioned plurality of input devices, to use only the necessary minimum limit of input devices, and to omit operation of other input devices if possible.

(4) To input a single character by an input operation of one or at least two of a plurality of inputs in from one to three consecutive steps.

Based on the above principles, Table 1 shows an embodiment of key operation sequences for inputting the 26 alphabetic characters (A)-(Z). The columns referred to as Step 1 to Step 3 in Table 1 show the reference numerals of the numeric keys operated in Step 1 to Step 3. When a sole reference numeral appears in Table 1, it indicates an operation of one numeric key per step. When two reference numerals appear together, for example (7·9), they indicate parallel operation of the numeric keys 7 and 9. That is, the keys are touched substantially simultaneously. Similarly, when three reference numerals appear together, they indicate parallel operation of the three numeric keys represented by those reference numerals.

TABLE 1

| Character | Step I | Step II | Step III |
|---|---|---|---|
| A | 8 | 1·3 | |
| B | 7·9 | 6 | 1·3 |
| C | 7·9 | 4 | 1·3 |
| D | 7·9 | 1·3 | |
| E | 7·9 | 4·5 | 1·3 |
| F | 7·9 | 4·5 | 1 |
| G | 7·9 | 1·3 | 6 |
| H | 7·9 | 4·6 | 1·3 |
| I | 8 or 8·2 | 2 | |
| J | 7·9 | 1·2 | |
| K | 7 or 9 | 1·9 1 | 3 |
| L | 7 | 1·3 | |
| M | 7·9 | 1·3 or 1·2·3 | 2 |
| N | 1 or 7 | 7·3 3 | 9 |
| O | 7·9 | 1·3 | 5 |
| P | 7·9 | 4·6 | 1 |
| Q | 7·9 or 5 | 1·3 3 | 5·3 |
| R | 7·9 | 4·6 | 3 |
| S | 7·9 | 3 | 1 |
| T | 7·9 | 8 | 2 |
| U | 7 | 1·3 | 9 |
| V | 7·9 | 2 | |
| W | 7·9 or 7·8·9 | 8 1·3 | 1·3 |
| X | 7·9 or 7·3 | 5 1·9 | 1·3 |
| Y | 7·9 | 5 | 2 |
| Z | 7·9 | 1 | 3 |

Figure 3C:
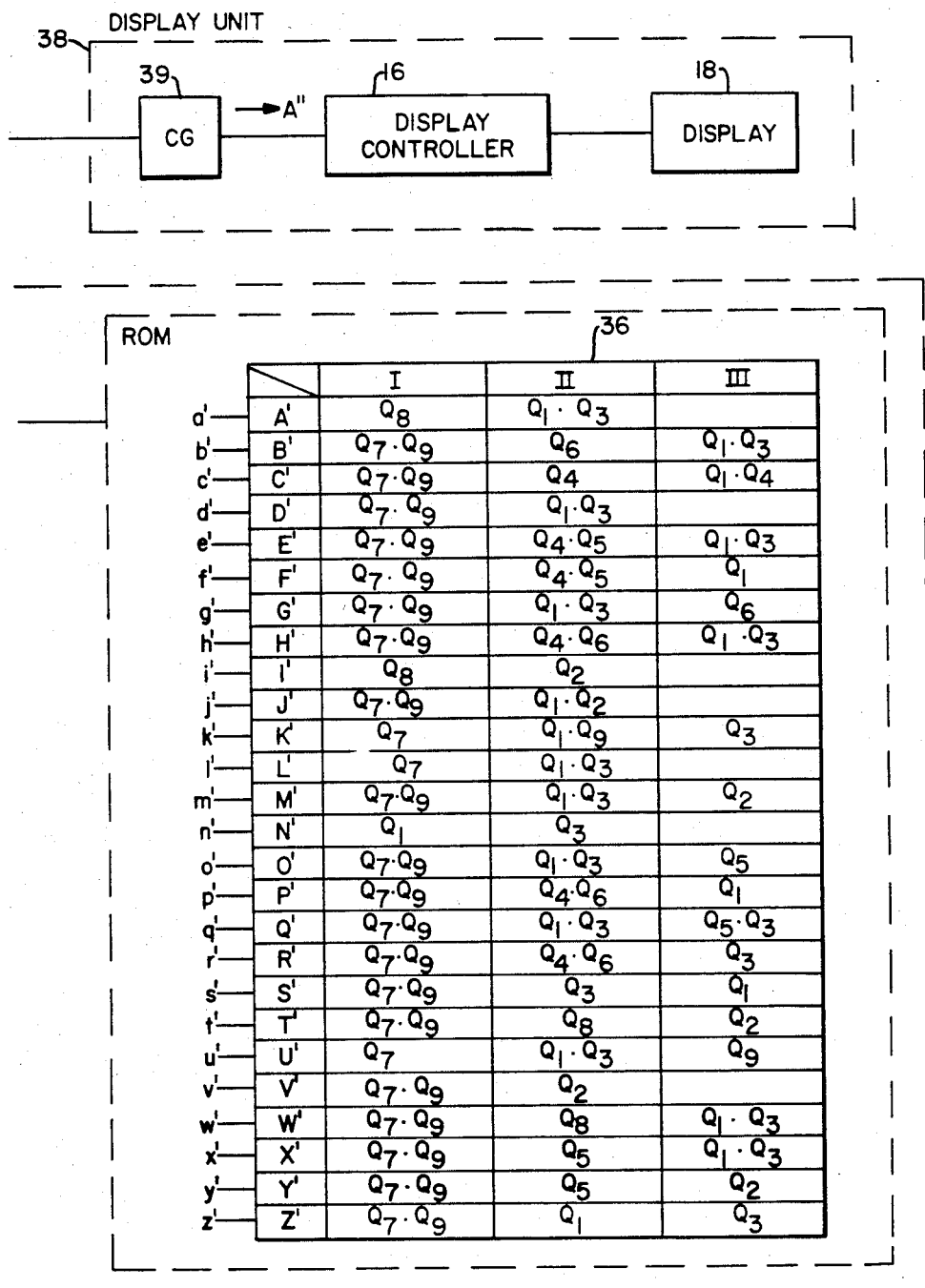

FIGS. 3A–3C are block diagrams showing a detailed embodiment of the character input controller 17 in FIG. 2. The control operation for inputting a character (alphabet) with the operating sequence shown in Table 1 shall be explained with reference to FIG. 3. FIG. 3 shows the conditions when the numeric keys 1–9 have been switched for use in character input by pressing the MODE key 11 in FIG. 2. The numeric keys 1–9 shown in FIG. 3 are disposed in the same configuration as shown in FIGS. 1 and 2.

Moreover, in the embodiment shown in FIG. 2, it was explained that a character code NC is inputted by pressing the numeric keys 1–9, but in the embodiment shown in FIG. 3, contact signals from the contacts $S_1$–$S_9$ that are produced in response to the pressing of the numeric keys 1–9 are used as the input signals. That is, in FIG. 3, one or more of the numeric keys 1–9 are pressed so that the corresponding contact $S_1$–$S_9$ close, and these contact signals are represented by $Q_1$–$Q_9$ in the drawing.

One terminal of each of the nine contacts $S_1$–$S_9$ is grounded, and each of the other terminals is connected through a resistor r to terminals on an input side of input registers 21, 22 and 23. That is, the input registers 21, 22 and 23 are all 9-bit registers, and input terminals at nine digit positions $e_1$–$e_9$, $f_1$–$f_9$ and $g_1$–$g_9$ in each register are connected respectively to one terminal of each contact $S_1$–$S_9$, as shown in the drawing. For example, one terminal of contact $S_1$ is connected to the input terminal at digit position $e_1$ in the register 21, to the input terminal at digit position $f_1$ in the register 22 and to the input terminal at digit position $g_1$ in the register 23. The other contacts $S_2$–$S_9$ are connected in a similar fashion.

In the present embodiment, when any of the input keys (numeric keys) is pressed, a connection is made so that contact data reporting the fact that a key has been pressed (contact signals $Q_1$–$Q_9$) is supplied simultaneously to the corresponding input terminals of the three input registers. Moreover, contact signals $Q_1$–$Q_9$ are supplied to a NAND gate 19 that functions as a NOR gate of negative logic.

In FIG. 3, when inputting the character (A) for example, by pressing the numeric key 8 as a first step the level of a contact signal $Q_8$ changes from $+V$ to $0V$. Consequently, the electric potential at the input terminals at digit position $e_8$ of the register 21, at digit position $f_8$ of the register 22 and on digit position $g_8$ of the register 23 becomes $0V$. On the other hand, the contact signal $Q_8$ (changing from $+V$ to $0V$) passes through the NAND gate 19 of negative logic to trigger monostable multivibrators 20 and 24. An output signal is derived from the monostable multivibrator 20 which has a time constant $T_1$. When time $T_1$ (for example, 100 ms) has elapsed after the monostable multivibrator 20 has been triggered, a counter 25 advances by one step. This counter 25 operates as a ternary counter for counting the number of steps when the numeric keys 1–9 are operated. The monostable multivibrator 24 which has a time constant $T_2$ functions as a timer, and produces an output signal when time $T_2$ (for example, 1 sec) has elapsed after the monostable multivibrator has been triggered.

When the counter 25 advances by one step, the level of the signal at output terminal $q_1$ of the counter 25 is "1" and this signal is transmitted to a clock terminal CK of the register 21 as a signal $EN_1$ and operates as a set pulse. Consequently, input data are set into the register 21. In this case, since only the input terminal at digit position $e_8$ is grounded, only the corresponding digit position $e_8$ is set with the binary signal "1". Furthermore, the signal level (1) at the output terminal $q_1$ of this counter 25 is transmitted to a gate terminal PB4 of an I/O port 26 in a microcomputer unit 40.

A supervisor routine $SV_1$ which is contained in a read only memory (ROM) 27 and which is operating permanently, continually supervises gate terminals PB4, PB5 and PB6 of I/O port 26. When this supervisor routine detects a change in the signal levels at the gate terminals PB4–PB6, it operates as shown in the flowchart shown in FIG. 4.

(1) Route $RT_1$:

When, as shown in step S1, the signal level at gate terminal PB4 of the I/O port 26 is (1), and the signal levels at gate terminals PB5 and PB6 are (0), binary digit "1" is written into an area $Y_1$ of a random access memory (RAM) 34.

(2) Route $RT_2$:

When, as shown in step S2, the signal level at the gate terminal PB5 of the I/O port 26 is (1), and the signal levels at gate terminals PB4 and PB6 are (0), binary digit "1" is written into an area $Y_2$ of the RAM 34.

(3) Route $RT_3$:

When, as shown in step S3, the signal level at the gate terminal PB6 of the I/O port 26 is (1), and the signal levels at gate terminals PB4 and PB5 are (0), binary digit "1" is written into an area $Y_3$ of the RAM 34.

Since, as described above, the signal level at gate terminal PB4 of the I/O port 26 is (1) in this case, the supervisor routine $SV_1$ performs the processing shown in route $RT_1$, that is, it sets binary digit "1" into the area $Y_1$ of the RAM 34.

Next, as the second step in inputting the character (A), the numeric key 1 and the numeric key 3 are pressed substantially simultaneously with two fingers (for example, the index finger and the ring finger). Normally, even when the operator intends to press two numeric keys simultaneously, the two corresponding contacts of the respective numeric keys would rarely close simultaneously, and it is more common that one of the contact signals appears first.

Accordingly, when the above-mentioned two numeric keys 1 and 3 are pressed, changes in the contact signals $Q_1$ and $Q_2$ caused by this pressing occur successively, and these changes appear at the respective input terminals of the registers 21, 22 and 23. That is, the signal level at the input terminals at digit positions $e_1$ and $e_3$ in the register 21, at digit positions $f_1$ and $f_3$ in the register 22 and at digit positions $g_1$ and $g_3$ in the register 23 change from $+V$ to $0V$.

For example, when contact signal $Q_1$ changes before contact signal $Q_3$, the contact signal $Q_1$ passes through the NAND gate 19 to trigger the monostable multivibrator 20. Furthermore, since the monostable multivibrator 24 which is used as a timer is already operating and has a large time constant $T_2$ (for instance 1 sec), this monostable multivibrator 24 is not restarted. Moreover, the monostable multivibrator 20 will not be retriggered by the contact signal $Q_3$ which arrives slightly later than the contact signal $Q_1$.

The monostable multivibrator 20 which is triggered by the contact signal $Q_1$ produces an output signal h after time $T_1$ has passed, and this signal advances the counter 25 further so that a count value of the counter becomes 2 at the same time as the signal level at the output terminal $q_2$ is (1). This signal level (1) is transmitted to the clock terminal CK of the register 22 as a signal $EN_2$ to operate as a set pulse. Consequently, input data are set into the register 22. Since only the input terminals at digit positions $e_1$ and $e_3$ are both grounded in this case, binary signal "1" is set at the corresponding digit positions $e_1$ and $e_3$. Moreover, the signal level (1) of the output terminal $q_2$ on the counter 25 is transmitted to the gate terminal PB5 of the I/O port 26 in the microcomputer unit 40.

Figure 4:
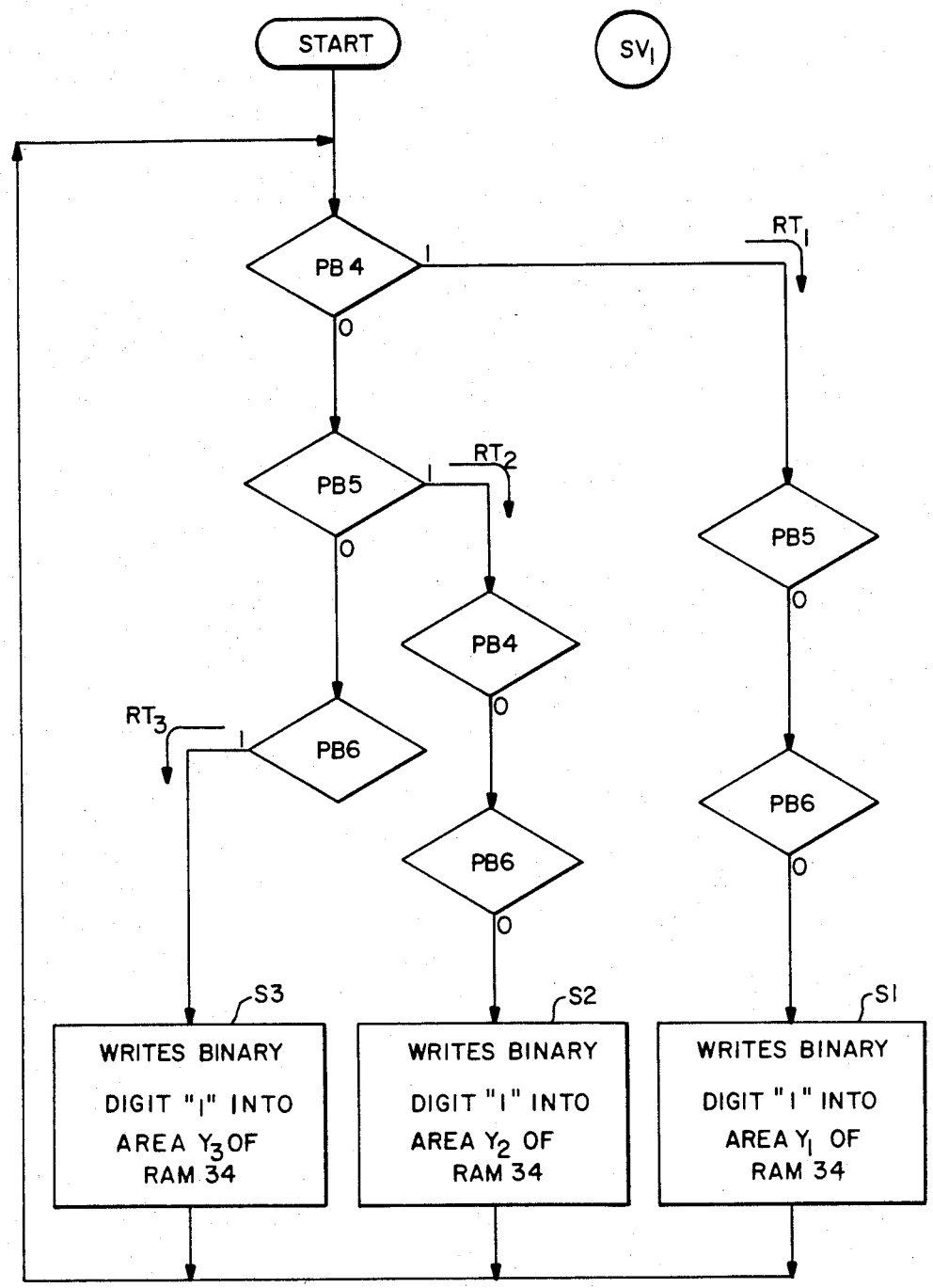
FIG. 4 is a flowchart illustrating an embodiment of a processing sequence of a supervisor routine $SV_1$ in the embodiment of the present invention shown in FIG. 3.

Since, as described above, the supervisor routine $SV_1$ is continuously supervising the gate terminals PB4–PB6 of the I/O port 26, the routine performs the processing in Route $RT_2$, as shown in FIG. 4. That is, binary digit "1" is written into an area $Y_2$ of a RAM 34.

After pressing the numeric key 8 as a first step, and then pressing the numeric keys 1 and 3 as a second step as described above, when the operator presses the ENTER key 12, a contact $S_0$ closes to generate a signal k which passes through an OR gate 32 and sets the signal level of a gate terminal PB7 of the I/O port 26 to (1). Moreover, since this signal k is also transmitted through a NOR gate 33 to the monostable multivibrator 24, this monostable multivibrator 24 which functions as a timer is reset.

A supervisor routine $SV_2$ which is contained in a ROM 27 and which is operating always supervises the gate terminal PB7 of the I/O port 26.

Figure 5:
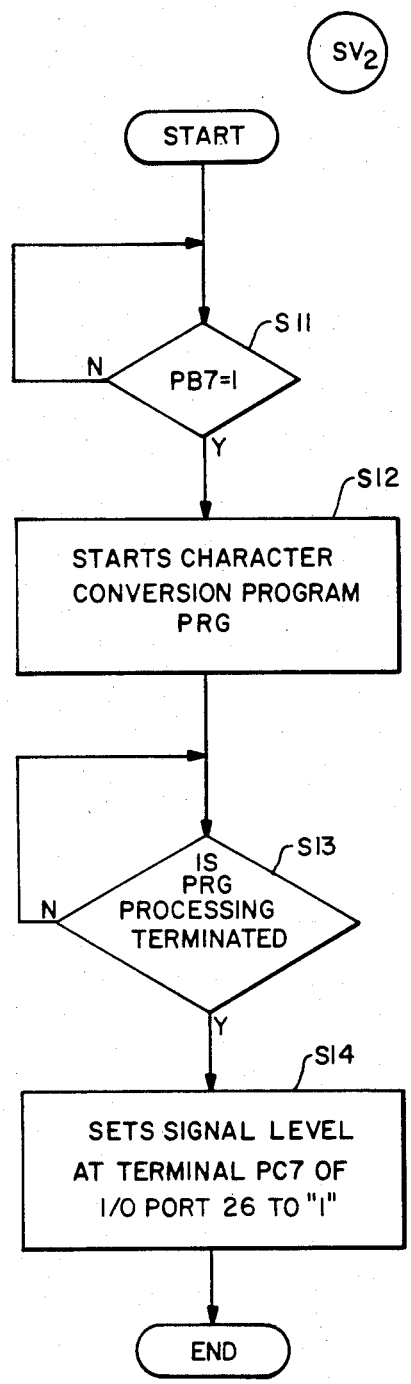
FIG. 5 is a flowchart illustrating an embodiment of a processing sequence of a supervisor routine $SV_1$ in the embodiment of the present invention shown in FIG. 3.

FIG. 5 is a flowchart showing an embodiment of a processing sequence of this supervisor routine $SV_2$. In FIG. 5, when the signal level at the terminal PB7 of the I/O port 26 is detected as (1) in step S11, the routine advances to step S12 and then starts the character conversion program PRG. In the next step S13, the routine checks whether or not the character conversion program PRG has terminated. When the program has terminated, the routine performs the processing in the next step S14. In this step S14, the signal level at a register terminal PC7 on the I/O port 26 is set to (1).

The conversion signal for the change in signal level at the register terminal PC7 from (0) to (1) which accompanies the processing in the above-mentioned step S14, that is signal RS, is transmitted to a reset terminal RST of the counter 25 to reset this counter 25. Moreover, the signal RS passes through the NOR gate 33 to also reset the monostable multivibrator 24 which functions as a timer.

Figure 6:
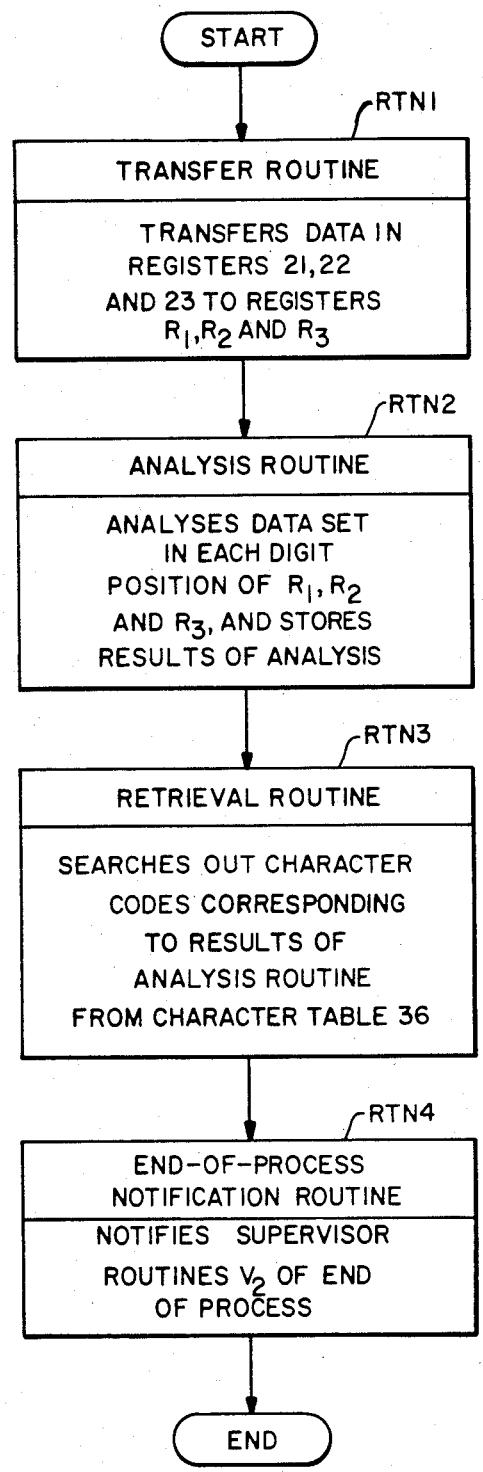
FIG. 6 is a flowchart illustrating an embodiment of a processing sequence of a character conversion program PRG in the embodiment of the present invention shown in FIG. 3.

The character conversion program PRG which is started by the supervisor routine $SV_2$ as described above performs the processing shown in the flowchart in FIG. 6.

Data transfer routine RTN1:
Transfers data from the registers 21–23 to the registers $R_1$–$R_3$.

Analysis routine RTN2:
Analyzes data set at each digit position of the registers $R_1$–$R_3$, and records results of this analysis.

Retrieval routine RTN3:
Searches out character codes corresponding to results obtained by analysis routine RTN2 from a character table 36, and transmits the results to a display unit 38.

End-of-process notification routine RTN4:
Notifies the supervisor routine $SV_2$ of the end of the process.

Detailed embodiment the processing in the above-mentioned routines RTN1–RTN3 will be explained with reference to FIGS. 7–9.

Figure 7:
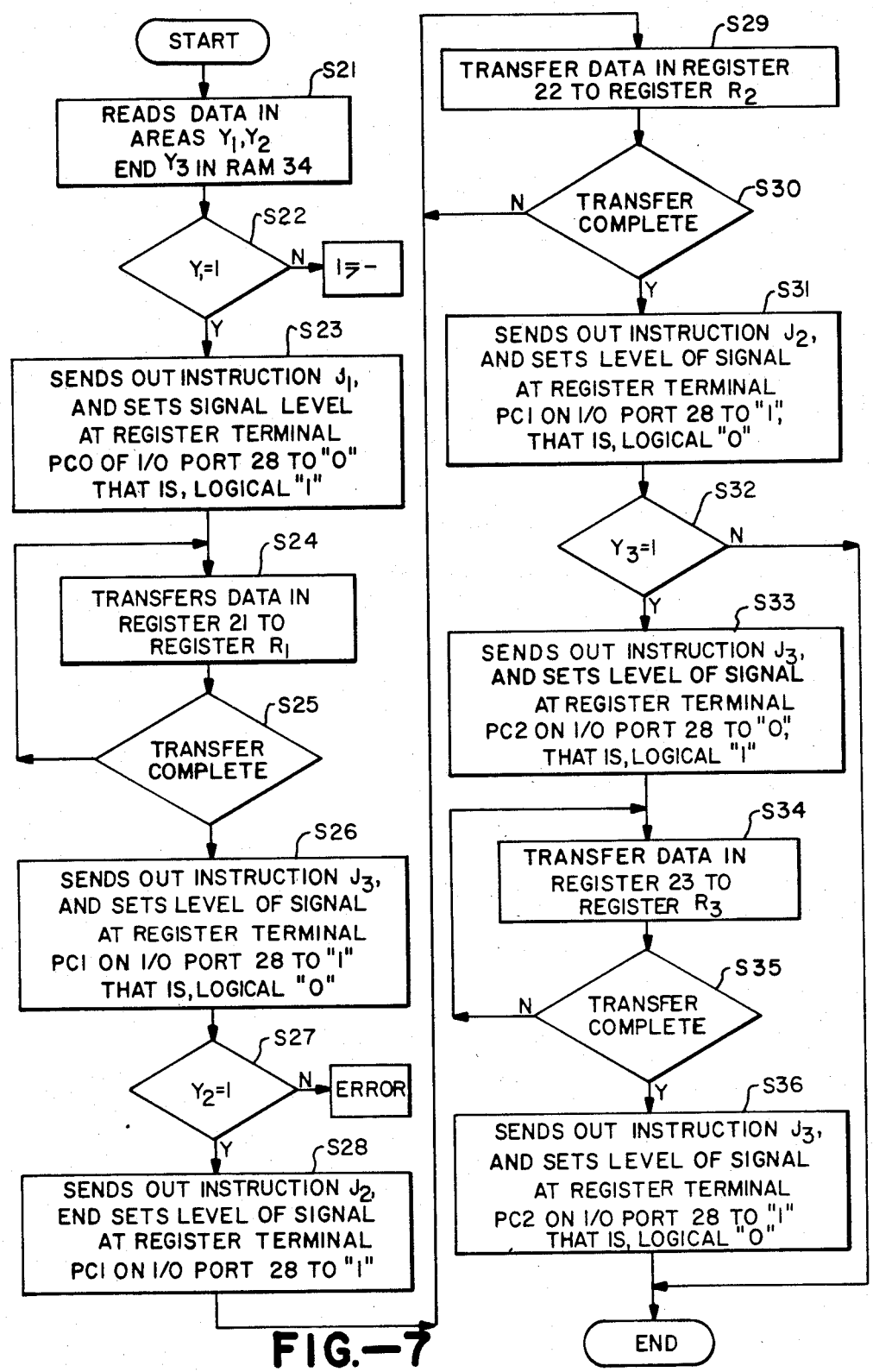
FIG. 7 is a flowchart illustrating a detailed embodiment of a processing sequence of a transfer routine in the character conversion program.

FIG. 7 is a flowchart explaining the processing in the data transfer routine RTN1. The control operations in FIG. 3 will be explained in accordance with the processing sequence in FIG. 7.

Step S21:
Reads data in areas $Y_1$, $Y_2$ and $Y_3$ of the RAM 34.

Step S22:
Performs processing in next step S23 when data in area $Y_1$ is "1". When data in area $Y_1$ is "0", the data is judged to be error.

Step S23:
Transmits instruction $J_1$ to a CPU 29 to set the signal level of a register terminal $PC_0$ of a port 28 to (0), thereby opening the gate on an output line of the register 21.

Step S24:
The CPU 29 transmits out a write instruction $W_1$ and an address pointer $P_1$ that specifies a register $R_1$ to a read/write controller 30. As a result, the data at digit positions $e_1$–$e_9$ of the register 21 pass through the gate terminals PA0-7 and PB0 to arrive at the CPU 29 and are written into a register $R_1$ of a RAM 31 by the read/write controller 30. That is, the data in the register 21 are transferred to the register $R_1$ exactly as they are, and the binary digit "1" is set at a digit position $L_8$ of the register $R_1$.

Step S25:
Judges the end of the transfer and performs processing in next step S26 when transfer is terminated.

Step S26:
The CPU 29 transmits the instruction $J_1$, and returns the signal level at a register terminal PC1 of the port 28 to (1), that is to logical "0". In other words, a gate (not shown) on the output side of the register 21 is closed.

Step S27:
Checks the area $Y_2$ of the RAM 34. When a binary digit "1" is set therein, the processing in the next step S28 proceeds. An error is judged when a binary digit "0" is set.

Step S28:
The CPU 29 transmits an instruction $J_2$, and signal level at the register terminal PC1 of the port 28 is set to (0), thereby opening the gate on the output side of the register 22.

Step S29:
The CPU 29 transmits a write instruction $W_2$ and an address pointer $P_2$ that specifies a register $R_2$ to the read/write controller 30. As a result, the data at digit positions $f_1$–$f_9$ of the register 22 pass through the gate terminals PA0-7 and PB0 of the port 28 to arrive at the CPU 29 to be written into a register $R_2$ of the RAM 31 by the read/write controller 30. That is, the data in the register 22 are transferred to the register $R_2$ exactly as they are, and the binary digit "1" is set respectively at digit positions $m_1$ and $m_3$ of the register $R_2$.

Step S30:
Judges the end of the transfer and the processing in next step S31 proceeds when the transfer is terminated.

Step S31:
The CPU 29 transmits the instruction $J_2$, and returns the signal level at a register terminal PC1 of a port 28 to (1), that is to logical "0". In other words, a gate (not shown) on the output side of the register 22 is closed.

Step S32:
Checks an area $Y_3$ of the RAM 34. When a binary digit "1" is set therein, the processing in the next step S33 proceeds. An error is judged when a binary digit "0" is set.

Step S33:
The CPU 29 transmits an instruction $J_3$, and signal level at the register terminal PC2 of the port 28 is set to (0), thereby opening the gate on an output side of the register 23.

Step S34:
The CPU 29 transmits a write instruction $W_3$ and an address pointer $P_3$ that specifies a register $R_3$. As a result, the data at digit positions $g_1$–$g_9$ of the register 22 pass through the gate terminals PA0-7 and PB0 of the port 28 to arrive at the CPU 29 to be written into a register $R_3$ of the RAM 31 by the read/write controller 30. That is, the data in the register 23 are transferred to the register $R_3$ exactly as they are, and the binary digit "1" is set respectively at digit positions $n_1$ and $n_3$ of the register $R_3$.

Step S35:
Judges the end of the transfer and the processing in next step S36 proceeds when the transfer is terminated.

Step S36:
The CPU 29 transmits the instruction $J_3$, and returns the signal level at a register terminal PC2 of a port 28 to (1), that is to logical "0". In other words, a gate (not shown) on the output side of the register 23 is closed.

Figure 8:
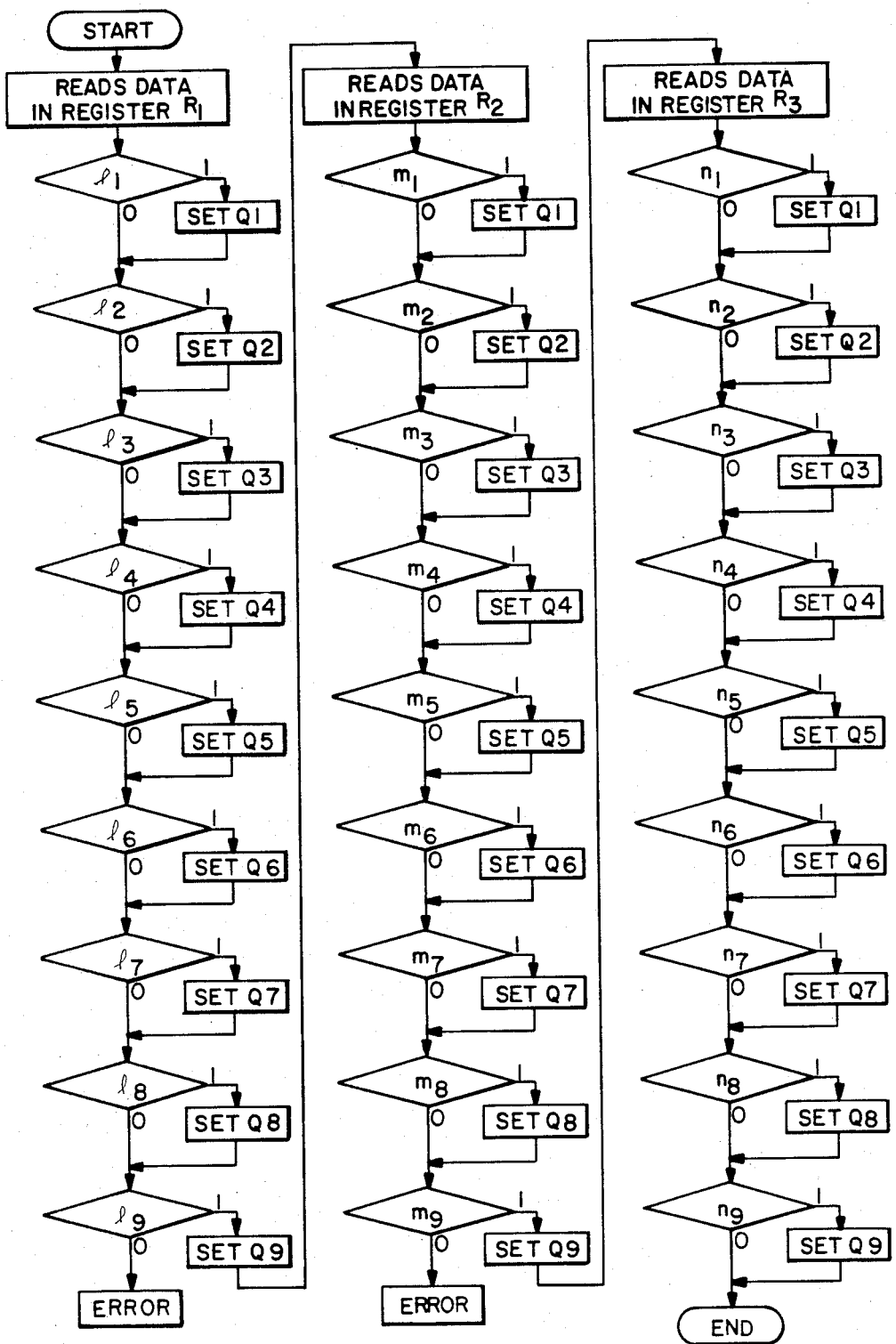
FIG. 8 is a flowchart illustrating a detailed embodiment of a processing sequence of an analysis routine in the character conversion program.

FIG. 8 is a flowchart showing an embodiment of a processing sequence of the analysis routine RTN2 in FIG. 6. The processing will now be explained using both FIGS. 3 and 8.

(i) The CPU 29 generates a read instruction $RD_1$. The read/write controller 30 which receives this instruction reads the data in the register $R_1$ and checks each of the digit positions $l_1-l_9$. When a digit position set with a binary digit "1" is detected, the contact data corresponding to the relevant digit position is written into an area $Z_1$ of the RAM 34. In the present embodiment, since "1" is set in at digit position $l_8$, the contact data $Q_8$ is written (that is, set) into the area $A_1$.

(ii) Next, the CPU 29 generates a read instruction $RD_2$. The read/write controller 30 which has received this instruction reads the data in the register $R_2$ and checks each of the digit positions $m_1-m_9$. When a digit position set with a binary digit "1" is detected, the contact data corresponding to the relevant digit position is written into an area $Z_2$ of the RAM 34. In the present embodiment, since "1" is set at the digit positions $m_1$ and $m_3$, the contact data $Q_1$ and $Q_3$ are written, that is, set, into the area $Z_2$.

(iii) Subsequently, the CPU 29 generates a read instruction $RD_3$. The read/write controller 30 which has received this instruction reads the data in the register $R_3$ and checks each of the digit positions $n_1-n_3$. When a digit position set with a binary digit "1" is detected, the contact data corresponding to the relevant digit position is written into an area $Z_3$ of the RAM 34. In the present embodiment, since no binary data are set in any of the digit positions, no contact data are written into the area $Z_3$.

FIGS. 9A-9E are flowcharts showing an embodiment of a processing sequence of the retrieval routine RTN3 shown in FIG. 6. The retrieval routine RTN3 retrieves the character codes that have the same contact data as the data set in the areas $Z_1$, $Z_2$ and $Z_3$ of the RAM 34.

A ROM 35 contains the character table 36, and character codes (for example, ASCII codes) for the alphabet A-Z are stored in this table 36. For each character code, contact data $Q_1-Q_9$ corresponding to the relevant character codes are stored in the columns I, II and III of the table 36. For example, in row a' of the character table 36 are stored the contact data $Q_8$ (column I) and the contact data $Q_1$ and $Q_3$ (column II). No contact data are stored in column III. In the other rows b'-z' as well, contact data are stored as shown in the table 36. The numerical suffixes following "Q" of the contact data are the same as in Table 1.

Figure 9C:
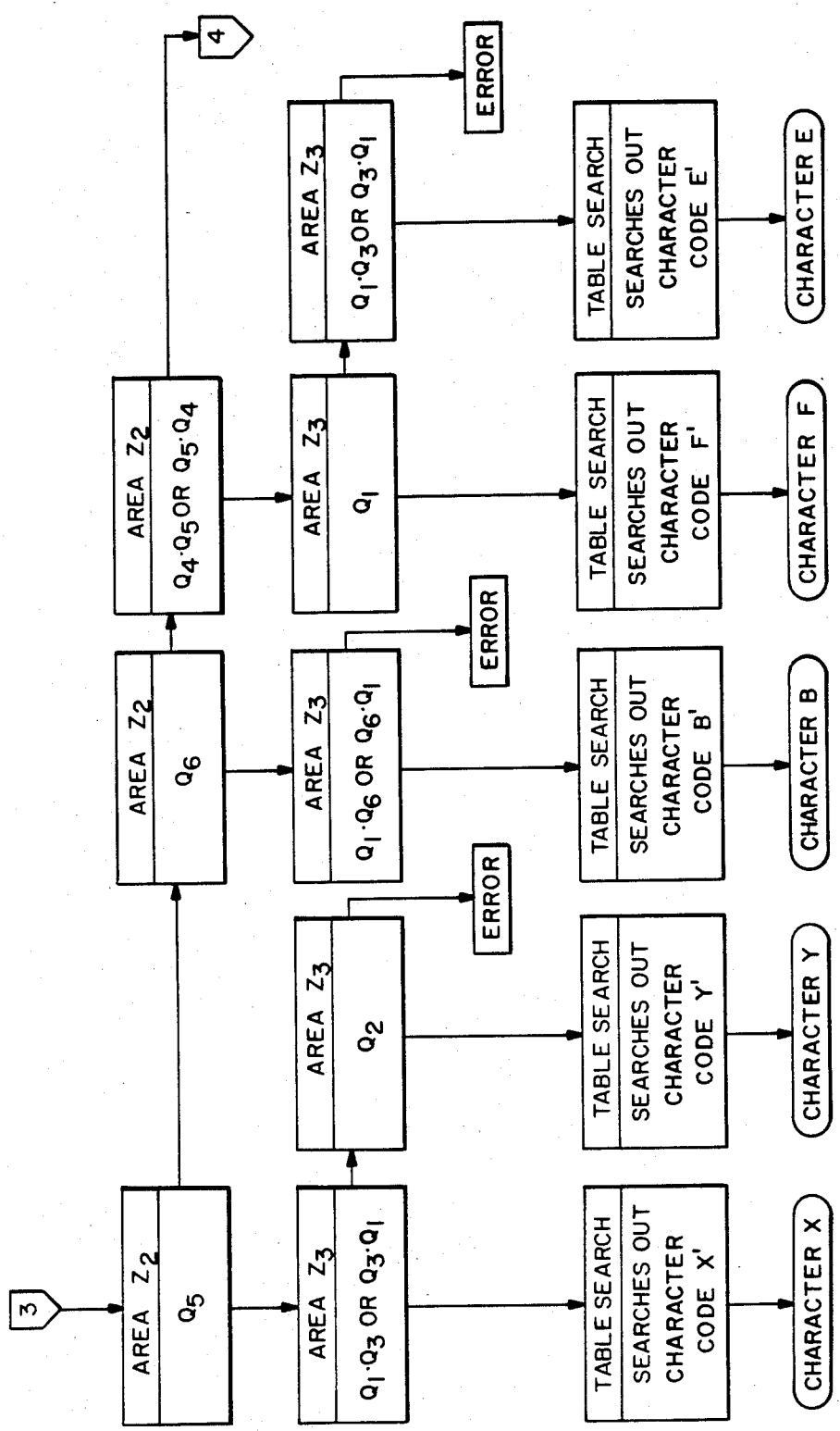

Consequently, the routine checks the data in the areas $Z_1-Z_3$ in accordance with the processing sequence in FIGS. 9A-9C and searches out the corresponding character code. That is, the CPU 29 transmits a read instruction (not shown) to the read/write controller 41. The data in the areas $Z_1$, $Z_2$ and $Z_3$ are read, and the character codes with the same data as these data thus read out are retrieved from the character table 36.

In the present embodiment, since the contact data $Q_8$ is set in the area $Z_1$, and the contact data $Q_1$ and $Q_3$ are set in the area $Z_2$, and no contact data are set in the area $Z_3$, the CPU 29 searches out the character code A' from the character table 36 and transmits this code to an output unit 38.

The end-of-process notification routine RTN4 in FIG. 6 notifies the supervisor routine $SV_2$ of the end of character code retrieval, that is of the termination of the character conversion program.

Further, the read/write controller 30 and the read/write controller 41 in FIG. 3 are separated only for the purpose of facilitating the explanation, and can be in reality formed as an integral controller. Similarly, the RAM 31 and RAM 34 may be formed by a sole memory.

The display unit 38 comprises a character generator 39, the display controller 16 and the display unit (for example, liquid crystal display) 18. The inputted character code A' is converted into display data A" for the character (A) by the character generator 39, and this is transmitted to the display controller 16 so that the character (A) is displayed on the display unit 18.

As described above, after pressing the numeric key 8 in the first step, and pressing the numeric keys 1 and 3 substantially simultaneously in the second step, when the ENTER key 12 is pressed, the character is immediately produced and displayed on the display 18 of the display unit 38.

The other alphabet characters B-Z can also be displayed by operating the numeric keys corresponding to the reference numerals in the chart, in the sequence of the steps I-III shown in Table 1.

In the input operations described above, after the numeric key 8 was pressed in the first step, and the numeric keys 1 and 3 were then pressed in the second step, the ENTER key 12 was pressed. This ENTER key 12 need not be pressed, however. This is because when the numeric key 8 is pressed in advance, the monostable multivibrator 24 is activated by the contact signal $Q_8$. After time $T_2$ (for example, 1 sec) has elapsed after this monostable multivibrator has been triggered, an output signal i is outputted. This signal i arrives at the OR gate 32, and since this acts in the same manner as the signal k which accompanies the pressing of the ENTER key 12, the character conversion processing is performed immediately.

Furthermore, when input operations of numeric keys involve from one to three steps, an output signal h from the monostable multivibrator 20 is outputted three times, so that the counter 25 proceeds by three counts. At this time, since an output signal j is outputted from the output terminal $q_4$ and this signal j is transmitted to the OR gate 32, the character conversion processing proceeds automatically also in this case.

Accordingly, the control of the character conversion processing accompanying the input operations is performed in the following ways.

(i) When the operations involve operation of the input keys from step 1 to step 3, character conversion processing is performed at the same time as the operations end. Consequently, there is no need to press the ENTER key 12.

(ii) When the operations involve operation of the input keys from step 1 to step 2, character conversion processing is performed either when the ENTER key 12 is pressed, or when the monostable multivibrator 24 as timer is cleared.

In the case described above in item (ii), selection of a suitable value for the time constant $T_2$ of the monostable multivibrator 24 makes it possible to adjust the character input speed, so that character input can be performed at a speed matched to the operator's skill.

Figure 10A:
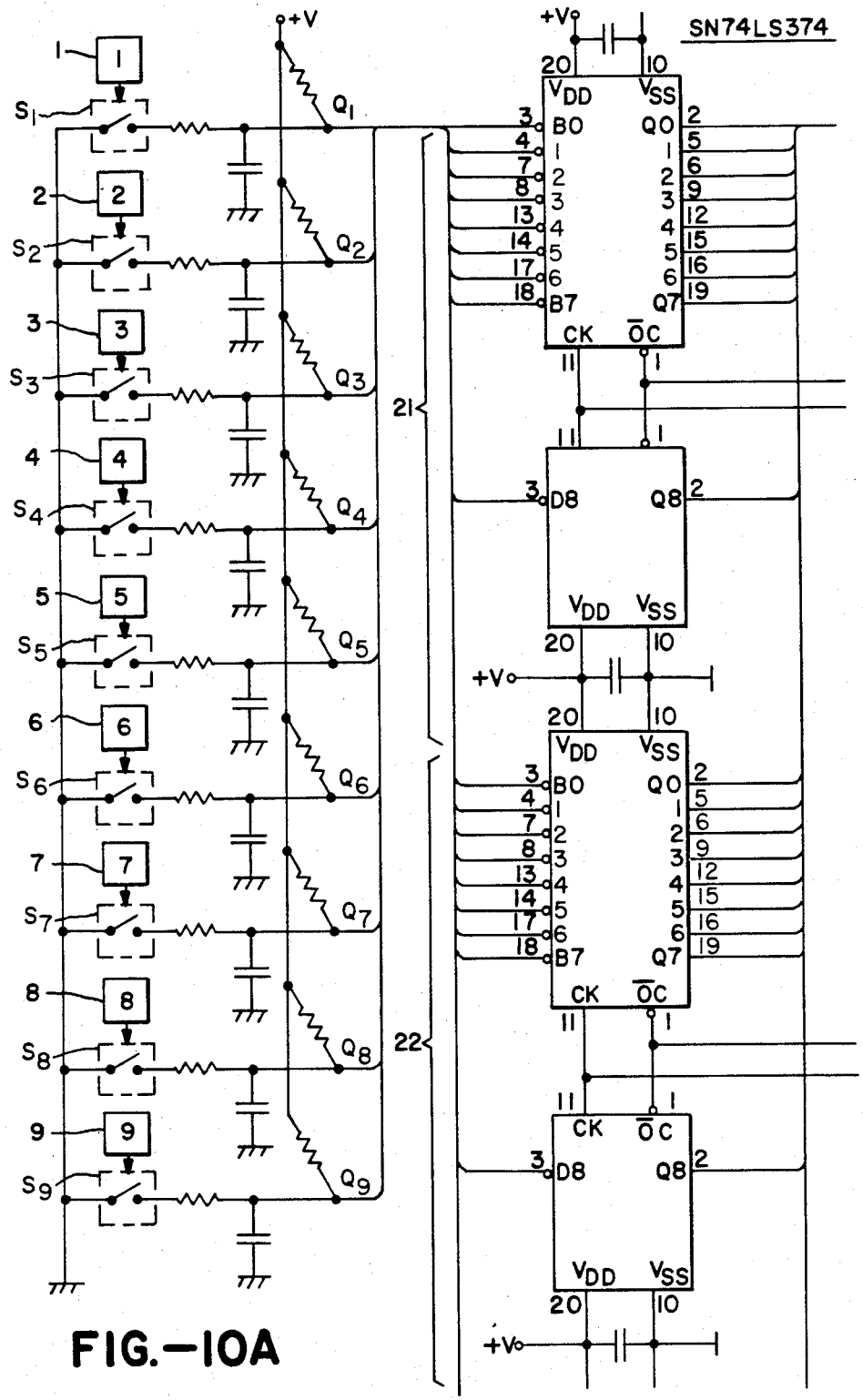
Figure 10C:
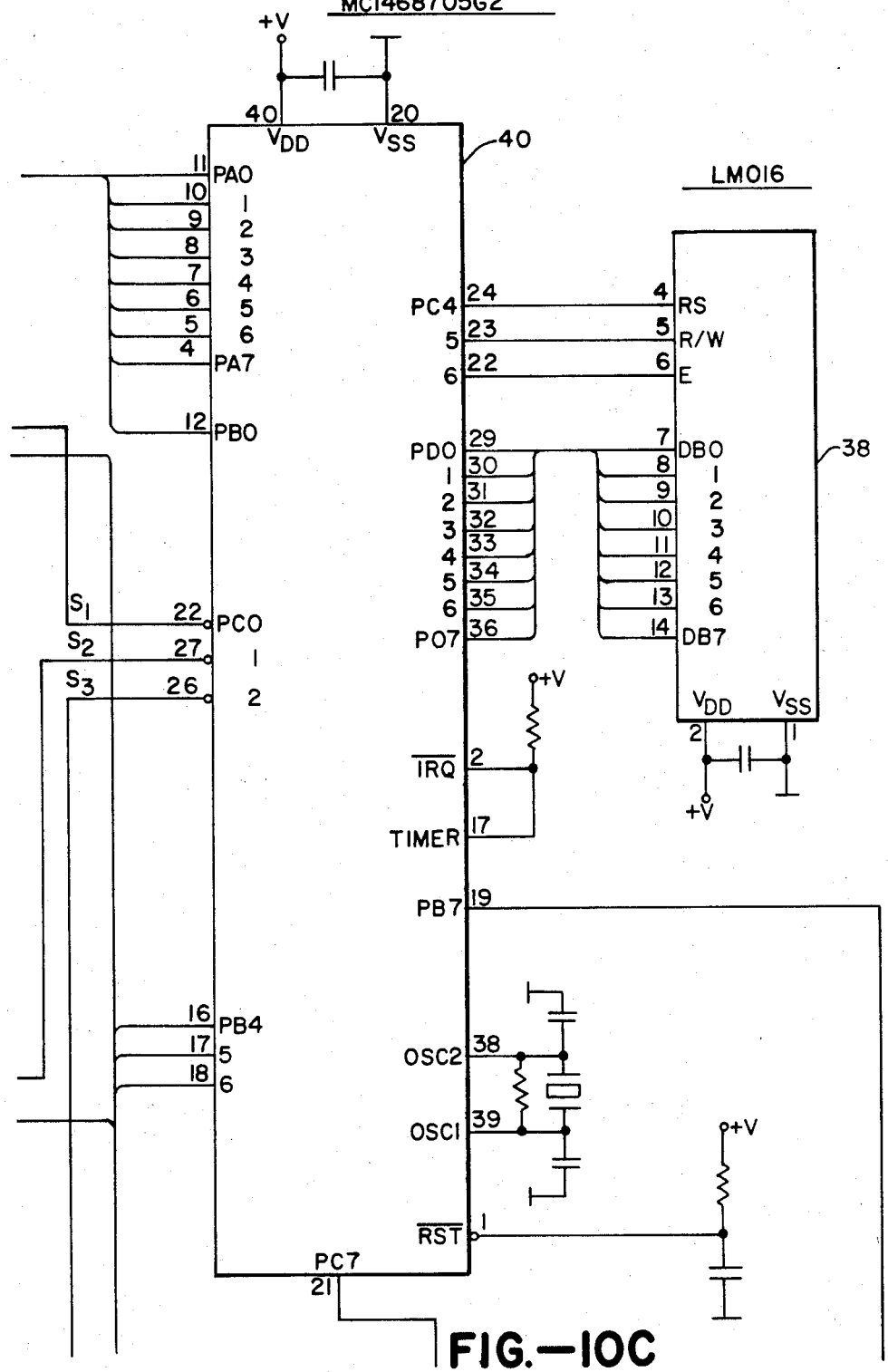

FIGS. 10A-10C show an embodiment of detailed circuit arrangement of the character input system shown in FIG. 3. The model numbers of the LSI circuits used in the present embodiment are shown in Table 2.

TABLE 2

| | |
|---|---|
| NAND gate 19 | MC14023B and MC14071B |
| Monostable multivibrators 20 and 24 | MC14538B |
| Input register 21 | SN74LS374 × 2 |
| Input register 22 | SN74LS374 × 2 |
| Input register 23 | SN74LS374 × 2 |
| Counter 25 | MC14022B |
| OR gate 32 | MC14075B |
| Inverter 33 | MC14001UB |
| Display unit 38 | LM016 |
| Microcomputer unit 40 | MC1468705G2 |

As described above, the present invention uses nine input devices, permits input of the 26 alphabetic characters by touching these input devices only two to three times, and also makes it possible to operate with a single hand. Since the sequences for touching the input devices are based on the shape of the characters, anyone can learn these sequences easily. Because the number of input devices is small, the surface area of the keyboard can be kept small, making it easy to keep units compact. In addition, the key-tops need not be marked and can be touch-typed easily. Furthermore, since the numeric keys 1–9 of the ten-key pad can also be used for alphabetic input, a ten-key pad allows for the input of both the numbers 0–9 and the 26 letters of the alphabet.

Accordingly, a character input device according to the present invention is useful as a compact alphanumeric input unit in such items as electronic memorandums with simple random access, electronic dictionaries, telephone units which activate an abbreviated dial function according to the input of a party's name or initial, VIDEOTEX input terminals, typewriters for blind people, portable word-processors, hand-held computers or handy terminals.

What is claimed is:

1. A character input system, comprising:
  input means including nine touch-activated input sections arranged in a 3×3 matrix for generating a plurality of input signals; and
  means for selecting between numeric and alphabetic character input modes;
  numeral generating means for operating in the numeric character input mode to said input means when one of said input sections is touch-activated to generate a numeral code corresponding to one of the numerals 1–9; and
  character generating means for for operating in the alphabetic character input mode to accept at least two input signals generated by touch-activating selected ones of said input sections including at least one of said input sections in the first row of said 3×3 matrix, generate character codes corresponding to the alphabetic letters A–Z comprising:
  means for temporarily storing said input signal generated each time that one of said input sections is touch-activated;
  means, responsive to the input signals, for determining that touch activation of said input sections for one character is completed in the alphabetic character mode, and
  means, responsive to said storing means and said determining means, for reading out said input signals stored in said storing means when said determining means determines that the touch activation for one character in said alphabetic character input mode is completed.

2. A character input device according to claim 1, wherein said input means includes nine input sections disposed in the following configuration:
  7 8 9
  4 5 6
  1 2 3
and said character generating means is responsive to the input signal patterns set forth in the following table:

| Character | INPUT SIGNAL PATTERNS | | |
|---|---|---|---|
| | I | II | III |
| A | 8 | 1·3 | |
| B | 7·9 | 6 | 1·3 |
| C | 7·9 | 4 | 1·3 |
| D | 7·9 | 1·3 | |
| E | 7·9 | 4·5 | 1·3 |
| F | 7·9 | 4·5 | 1 |
| G | 7·9 | 1·3 | 6 |
| H | 7·9 | 4·6 | 1·3 |
| I | 8 or 8·2 | 2 | |
| J | 7·9 | 1·2 | |
| K | 7 or 9 | 1·9 1 | 3 |
| L | 7 | 1·3 | |
| M | 7·9 | 1·3 or 1·2·3 | 2 |
| N | 1 or 7 | 7·3 3 | 9 |
| O | 7·9 | 1·3 | 5 |
| P | 7·9 | 4·6 | 1 |
| Q | 7·9 or 5 | 1·3 3 | 5·3 |
| R | 7·9 | 4·6 | 3 |
| S | 7·9 | 3 | 1 |
| T | 7·9 | 8 | 2 |
| U | 7 | 1·3 | 9 |
| V | 7·9 | 2 | |
| W | 7·9 or 7·8·9 | 8 1·3 | 1·3 |
| X | 7·9 or 7·3 | 5 1·9 | 1·3 |
| Y | 7·9 | 5 | 2 |
| Z | 7·9 | 1 | 3 |

3. A character input system according to claim 1, wherein said input means includes nine input sections disposed in the following configuration:
  1 2 3
  4 5 6
  7 8 9
and said character generating means is responsive to the input signal patterns set forth in the following table:

| Character | INPUT SIGNAL PATTERNS | | |
|---|---|---|---|
| | I | II | III |
| A | 2 | 7·9 | |
| B | 1·3 | 6 | 7·9 |
| C | 1·3 | 4 | 7·9 |
| D | 1·3 | 7·9 | |
| E | 1·3 | 4·5 | 7·9 |
| F | 1·3 | 4·5 | 7 |
| G | 1·3 | 7·9 | 6 |
| H | 1·3 | 4·6 | 7·9 |
| I | 2 or 2·8 | 8 | |
| J | 1·3 | 7·8 | |
| K | 1 or 3 | 7·3 7 | 9 |
| L | 1 | 7·9 | |
| M | 1·3 | 7·9 or 7·8·9 | 8 |
| N | 7 or 1 | 1·9 9 | 3 |
| O | 1·3 | 7·9 | 5 |
| P | 1·3 | 4·6 | 7 |

-continued

| Character | INPUT SIGNAL PATTERNS | | |
|---|---|---|---|
| | I | II | III |
| Q | 1·3 or 5 | 7·9 9 | 5·9 |
| R | 1·3 | 4·6 | 9 |
| S | 1·3 | 9 | 7 |
| T | 1·3 | 2 | 8 |
| U | 1 | 7·9 | 3 |
| V | 1·3 | 8 | |
| W | 1·3 or 1·2·3 | 2 7·9 | 7·9 |
| X | 1·3 or 1·9 | 5 7·3 | 7·9 |
| Y | 1·3 | 5 | 8 |
| Z | 1·3 | 7 | 9 |

4. A character input system according to claim 1, wherein said determining means comprises entry means for instructing said character generating means to generate a character code in response to an accepted input signal pattern.

5. A character input system according to claim 1, wherein said character generating means comprises means for storing data corresponding to predetermined relationships between input signal patterns and character codes.

6. A character input system according to claim 2, further comprising means for storing the table.

7. A character input system according to claim 1, wherein input signals corresponding to at least two of said input sections in the same row of the matrix are generated substantially simultaneously.

8. A character input input device according to claim 7, wherein said inpt means includes nine input sections disposed in the following configuration:
7 8 9
4 5 6
1 2 3
and said character generating means is responsive to the input signal patterns set forth in the following table;

| Character | INPUT SIGNAL PATTERNS | | |
|---|---|---|---|
| | I | II | III |
| A | 8 | 1·3 | |
| B | 7·9 | 6 | 1·3 |
| C | 7·9 | 4 | 1·3 |
| D | 7·9 | 1·3 | |
| E | 7·9 | 4·5 | 1·3 |
| F | 7·9 | 4·5 | 1 |
| G | 7·9 | 1·3 | 6 |
| H | 7·9 | 4·6 | 1·3 |
| I | 8 or 8·2 | 2 | |
| J | 7·9 | 1·2 | |
| K | 7 or 9 | 1·9 1 | 3 |
| L | 7 | 1·3 | |
| M | 7·9 | 1·3 or 1·2·3 | 2 |
| N | 1 or 7 | 7·3 3 | 9 |
| O | 7·9 | 1·3 | 5 |

-continued

| Character | INPUT SIGNAL PATTERNS | | |
|---|---|---|---|
| | I | II | III |
| P | 7·9 | 4·6 | 1 |
| Q | 7·9 or 5 | 1·3 3 | 5·3 |
| R | 7·9 | 4·6 | 3 |
| S | 7·9 | 3 | 1 |
| T | 7·9 | 8 | 2 |
| U | 7 | 1·3 | 9 |
| V | 7·9 | 2 | |
| W | 7·9 or 7·8·9 | 8 1·3 | 1·3 |
| X | 7·9 or 7·3 | 5 1·9 | 1·3 |
| Y | 7·9 | 5 | 2 |
| Z | 7·9 | 1 | 3 |

9. A character input system according to claim 7, wherein said input means includes nine sections disposed in the following configuration:
1 2 3
4 5 6
7 8 9
and said character generating means is responsive to the input signal patterns set forth in the following table;

| Character | INPUT SIGNAL PATTERNS | | |
|---|---|---|---|
| | I | II | III |
| A | 2 | 7·9 | |
| B | 1·3 | 6 | 7·9 |
| C | 1·3 | 4 | 7·9 |
| D | 1·3 | 7·9 | |
| E | 1·3 | 4·5 | 7·9 |
| F | 1·3 | 4·5 | 7 |
| G | 1·3 | 7·9 | 6 |
| H | 1·3 | 4·6 | 7·9 |
| I | 2 or 2·8 | 8 | |
| J | 1·3 | 7·8 | |
| K | 1 or 3 | 7·3 7 | 9 |
| L | 1 | 7·9 | |
| M | 1·3 | 7·9 or 7·8·9 | 8 |
| N | 7 or 1 | 1·9 9 | 3 |
| O | 1·3 | 7·9 | 5 |
| P | 1·3 | 4·6 | 7 |
| Q | 1·3 or 5 | 7·9 9 | 5·9 |
| R | 1·3 | 4·6 | 9 |
| S | 1·3 | 9 | 7 |
| T | 1·3 | 2 | 8 |
| U | 1 | 7·9 | 3 |
| V | 1·3 | 8 | |
| W | 1·3 or 1·2·3 | 2 7·9 | 7·9 |
| X | 1·3 or 1·9 | 5 7·3 | 7·9 |
| Y | 1·3 | 5 | 8 |
| Z | 1·3 | 7 | 9 |

10. A character input system according to claim 7, wherein said determining means comprises entry means for instructing said character generating means to generate a character code in response to an accepted input signal pattern.

11. A character input system according to claim 9, further comprising means for storing the table.

* * * * *